March 4, 1952 A. J. BUSCH ET AL 2,587,817

TELEPHONE SYSTEM

Filed Dec. 31, 1948 27 Sheets-Sheet 1

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 2

INVENTORS A. J. BUSCH
H. J. MICHAEL

BY P. C. Smith

ATTORNEY

INVENTORS A. J. BUSCH
H. J. MICHAEL
BY
P. C. Smith
ATTORNEY

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 5

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 6

INVENTORS A. J. BUSCH
H. J. MICHAEL
BY
P. C. Smith
ATTORNEY

INVENTORS A. J. BUSCH
H. J. MICHAEL
BY
P. C. Smith
ATTORNEY

INVENTORS A. J. BUSCH
H. J. MICHAEL
BY O. C. Smith
ATTORNEY

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 10

INVENTORS A. J. BUSCH
H. J. MICHAEL

BY P. C. Smith

ATTORNEY

INVENTORS A. J. BUSCH
H. J. MICHAEL
BY
P. C. Smith
ATTORNEY

March 4, 1952 A. J. BUSCH ET AL 2,587,817

TELEPHONE SYSTEM

Filed Dec. 31, 1948 27 Sheets-Sheet 12

INVENTORS A. J. BUSCH
H. J. MICHAEL
BY
P. C. Smith
ATTORNEY

INVENTORS A. J. BUSCH
H. J. MICHAEL
BY
R. C. Smith
ATTORNEY

March 4, 1952 A. J. BUSCH ET AL 2,587,817

TELEPHONE SYSTEM

Filed Dec. 31, 1948 27 Sheets-Sheet 14

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 15

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 16

INVENTORS A. J. BUSCH
H. J. MICHAEL
BY P. C. Smith
ATTORNEY

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 18

INVENTORS A. J. BUSCH
H. J. MICHAEL

BY

G. C. Smith

ATTORNEY

March 4, 1952 | A. J. BUSCH ET AL | 2,587,817

TELEPHONE SYSTEM

Filed Dec. 31, 1948 | 27 Sheets-Sheet 19

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 20

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 21

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 22

INVENTORS A. J. BUSCH
H. J. MICHAEL
BY
G. C. Smith
ATTORNEY

March 4, 1952 A. J. BUSCH ET AL 2,587,817

TELEPHONE SYSTEM

Filed Dec. 31, 1948 27 Sheets-Sheet 23

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 24

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 25

INVENTORS A. J. BUSCH
H. J. MICHAEL

BY P. C. Smith

ATTORNEY

March 4, 1952 | A. J. BUSCH ET AL | 2,587,817

TELEPHONE SYSTEM

Filed Dec. 31, 1948 | 27 Sheets-Sheet 26

INVENTORS A. J. BUSCH
H. J. MICHAEL
BY P. C. Smith
ATTORNEY

March 4, 1952 A. J. BUSCH ET AL 2,587,817

TELEPHONE SYSTEM

Filed Dec. 31, 1948 27 Sheets-Sheet 27

INVENTORS A. J. BUSCH
H. J. MICHAEL

BY P. C. Smith

ATTORNEY

Patented Mar. 4, 1952

2,587,817

UNITED STATES PATENT OFFICE 2,587,817

TELEPHONE SYSTEM

Aloysius J. Busch, Madison, N. J., and Henry J. Michael, Mineola, N. Y., assignors to Bell Telephone Laboratories, Incorporated, New York, N. Y., a corporation of New York Application December 31, 1948, Serial No. 68,548

12 Claims. (Cl. 179—18)

This invention relates generally to automatic telephone systems and particularly to such systems as are disclosed in the Patent 2,585,904 to A. J. Busch of February 19, 1952, entitled "Cross Bar Telephone System," when used as a tandem or toll switching office as well as a central office serving local subscribers.

Busch discloses the circuit operations involved in a so-called intraoffice call which is a call extending from one subscriber to another over an intraoffice trunk within the same central office. Busch further discloses, among other matters, the circuit operations necessary to complete a so-called outgoing call which is one extending from a subscriber within the local central office over an outgoing trunk to a subscriber within a remote central office to which the outgoing trunk has direct access. Patent 2,535,661 to A. O. Adam, Jr. and R. C. Avery of December 26, 1950, employs parts of the Busch disclosure by reference and discloses, as descriptive of the utility of the invention disclosed therein, the circuit operations involved in a typical so-called incoming call which is a call initiated from some remote location over an incoming trunk to a local subscriber.

The present invention concerns the use of a telephone system such as disclosed by Busch or by Adam and Avery, or both, when used to control not only a locally terminating call but also a tandem or toll connection, which latter alternative connection is a connection from a remote office over an incoming trunk to another remote office over a suitable outgoing trunk. The disclosures of Busch or of Adam and Avery, or both, are to be considered as incorporated herein by reference in regard to details not disclosed herein due to the fact that certain circuits and equipment are shown diagrammatically or skeletonized herein for conciseness of disclosure.

The main object of the present invention is to improve toll and tandem automatic telephone switching systems.

A particular object is to make automatic toll and tandem switching circuits more flexible, more reliable, and more versatile.

A feature of the invention is the provision of switching means in an automatic telephone system whereby a call initiated from a remote office may be terminated locally or switched on a so-called "through" connection to a direct, tandem, or toll outgoing trunk.

Another feature of the invention is the provision of special terminations for incoming trunks which require a through connection to outgoing toll or tandem trunks. Such terminations are similar to those for local subscribers. Such terminations facilitate the completion of such through connections on a basis similar to the functioning of the control circuits for a connection from a local subscriber over an outgoing trunk as disclosed by Busch. These trunks, of course, will be terminated as well in the same manner as other incoming trunks which do not require through connections.

The present invention is disclosed, by way of example, with the provision of an intertoll incoming trunk and an intertoll outgoing trunk. The intertoll incoming trunk can perform as an incoming trunk requiring a local termination, as described in the Adam-Avery disclosure; it can perform as an incoming trunk requiring a through connection to an outgoing trunk leading directly to the called office, or as requiring a tandem through connection; it can perform as an incoming trunk requiring a through connection to an outgoing toll trunk leading to a further toll or tandem routing office. The intertoll outgoing trunk can perform as an outgoing trunk, tandem or otherwise, direct to the called office, as described in the Busch disclosure in connection with a locally initiated subscriber outgoing call; it can perform as an outgoing toll trunk terminating in a further toll routing office.

The present invention will be disclosed by example in connection with a tandem call. The incoming trunk will be assumed to receive at least seven digits comprising three office code digits and four numericals of the called subscriber's directory number. The trunk makes connection to an incoming register through an incoming register link and registers in said register the number of the trunk-link frame terminating said trunk, the trunk number, the class of the call (tandem, toll, incoming, etc.), the office code of the called subscriber, and the numericals of the called subscriber's number. The incoming register makes connection to a marker over an incoming register marker connector and transmits to said marker the above registered information. The marker, being informed that this call is of the assumed tandem class, proceeds to select an idle outgoing sender and a proper outgoing trunk, interconnects the two, and holds these connections until the through connection is made between the trunks. In the meantime, the marker will have transmitted from the originating register to registers in the sender the full office code and numericals of the called subscriber's number. The marker makes connection to a trunk number group translator circuit, transmits to it the number of the incoming trunk, and receives from said translator the location information for the special termination on the line-link frames (similar to that for a local subscriber) of the incoming trunk. The marker then proceeds to establish an interconnection between a line-link frame termination of the incoming trunk and the outgoing trunk termination on a trunk-link frame similarly to its operations in completing a subscriber outgoing connection. The marker, number group, and incoming register release whereupon the outgoing sender outpulses the called directory number as directed by the marker and releases, leaving the connection under the supervision of the trunk circuits.

The above general description of an embodiment of the present invention is developed in detail hereinafter in connection with the drawings forming a part of this disclosure. The drawings may be described generally as follows:

Fig. 1 shows, diagrammatically, cross bar switch frames comprising interconnected line-link frames and trunk-link frames, subscriber and incoming trunk terminations on line-link frames, incoming and outgoing trunk terminations on trunk-link frames, line-link and trunk-link connectors whereby a marker may effect access to such frames, an incoming register marker connector whereby an incoming register may effect access to a marker, an outgoing sender connector through which a marker connects to a sender, an outgoing sender, and an outgoing sender link for interconnecting a sender with an outgoing trunk;

Figs. 2, 3 and 4 show a complete outgoing intertoll trunk circuit;

Figs. 5 and 7 and the right-hand part of Fig. 6 show a complete incoming intertoll trunk circuit;

The left-hand part of Fig. 6 shows a ringing selection switch associable with an incoming trunk for the purpose of ringing a called local subscriber when necessary;

Figs. 8 and 9 disclose an incoming register link circuit whereby an incoming trunk gains access to an incoming register;

Figs. 10 through 21, and 27 disclose an incoming register circuit;

Figure 1:
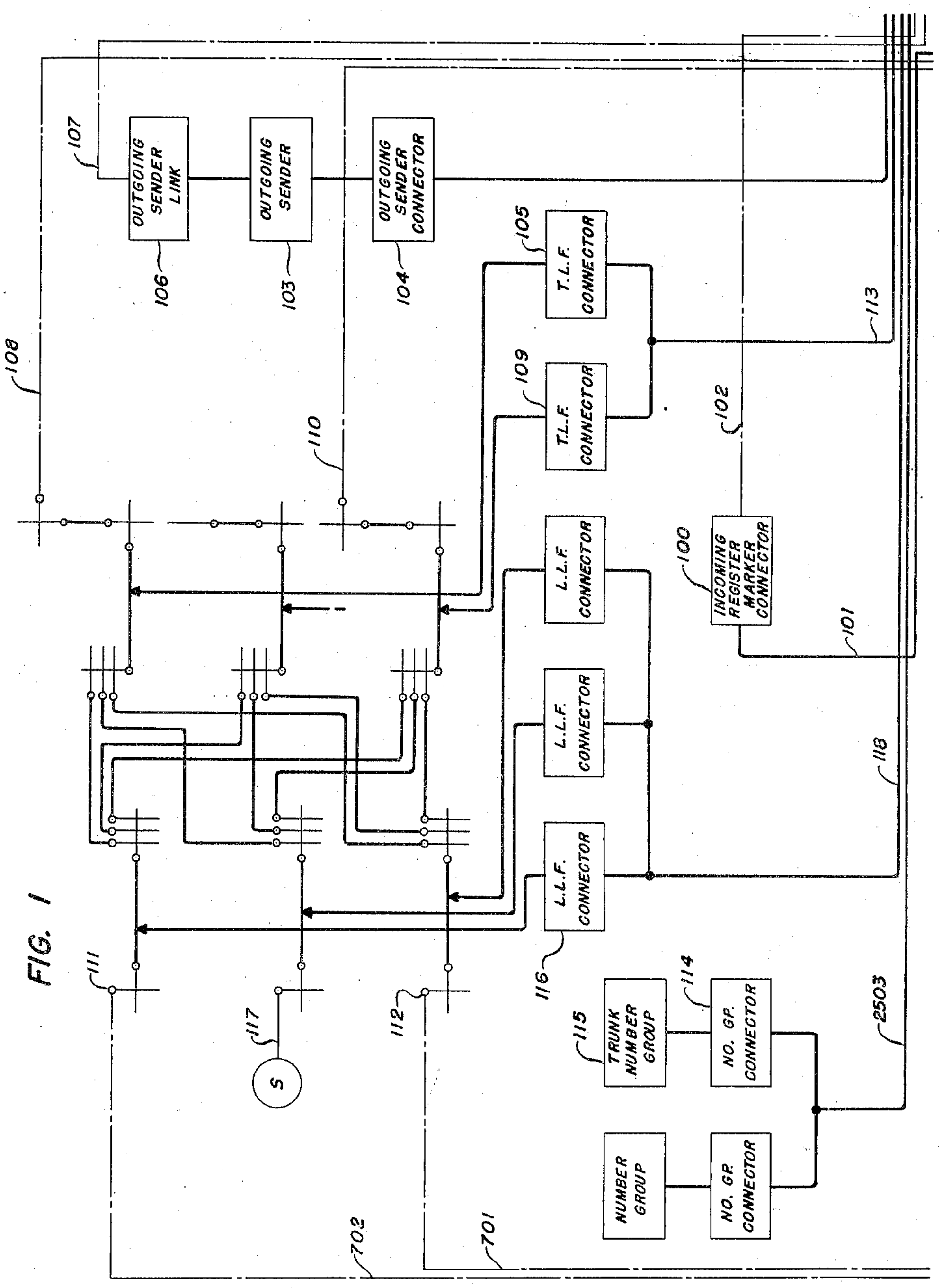

Since it is believed that the best understanding of the present invention will be obtained from a description of a typical call, such description follows and involves a tandem through connection.

In the following description of a through tandem class connection, the following assumptions are made:

1. The class of call handled by the incoming intertoll trunk is the so-called tandem class.

2. The incoming trunk terminates upon trunk-link frame 00, providing a tens digit 0 and a units digit 0.

3. The arbitrary number of the incoming trunk is 00 which shall be changed to another arbitrary number 010 before such number is used for identification purposes as to equipment location.

4. The incoming trunk transmits, as a tandem call, a seven-digit called directory number or an eight-digit number if an additional digit is necessary for party identification on a party line.

5. Office directory codes beginning with the digit 2 will not require the eighth digit; office codes beginning with 9 will require such extra digit.

6. The called directory number is Chelsea 3–1245 representing the office code digits 243 and the subscriber's line numericals 1245.

7. As an alternative arrangement, if desired, the called directory number, if for a substation on a party line, is Whitehall 3–1245–M representing the office code digits 943, the subscribers' line numericals 1245, and the substation identifying digit 6.

*Seizing the incoming trunk*

Figure 5:
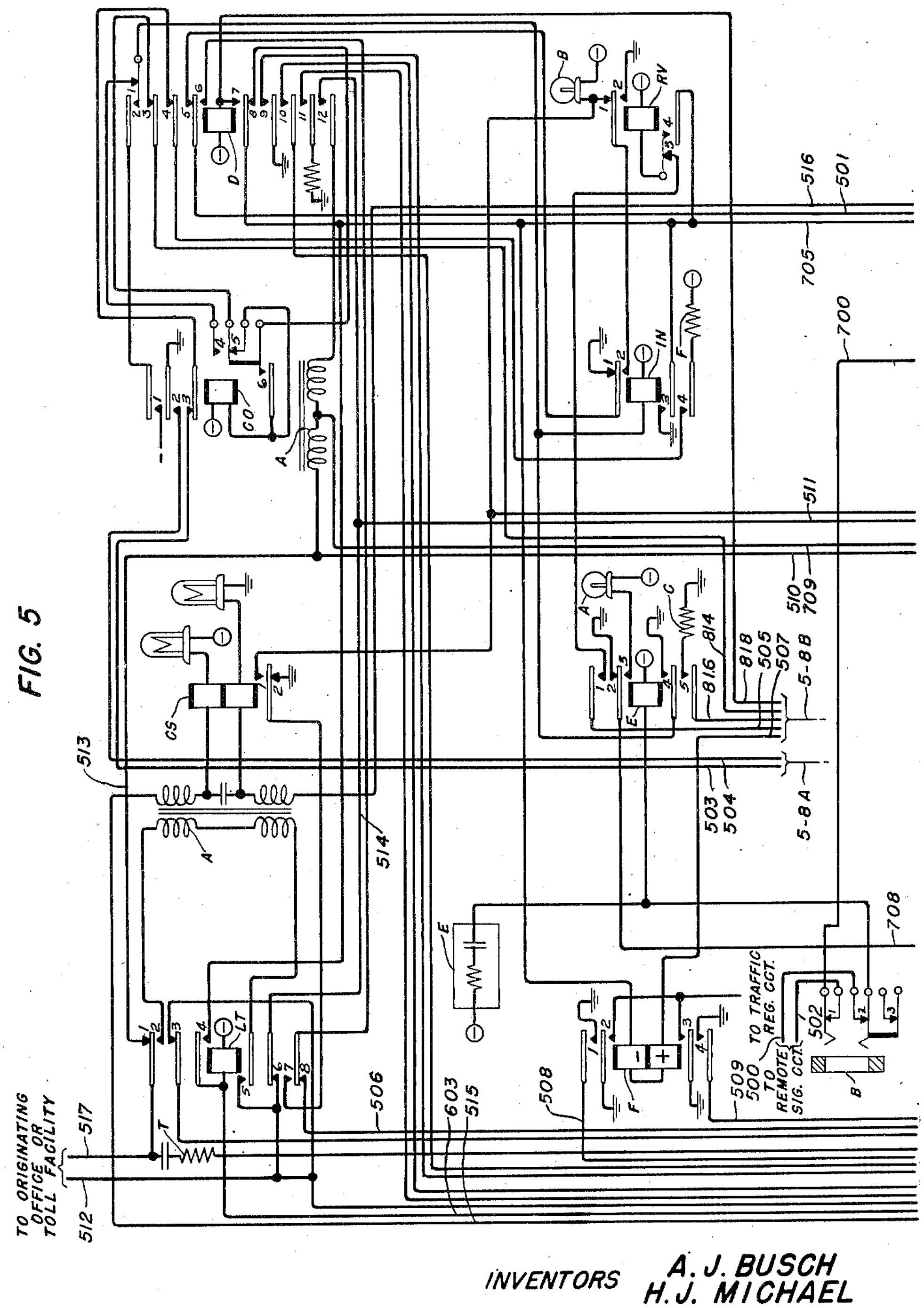
Figure 6:
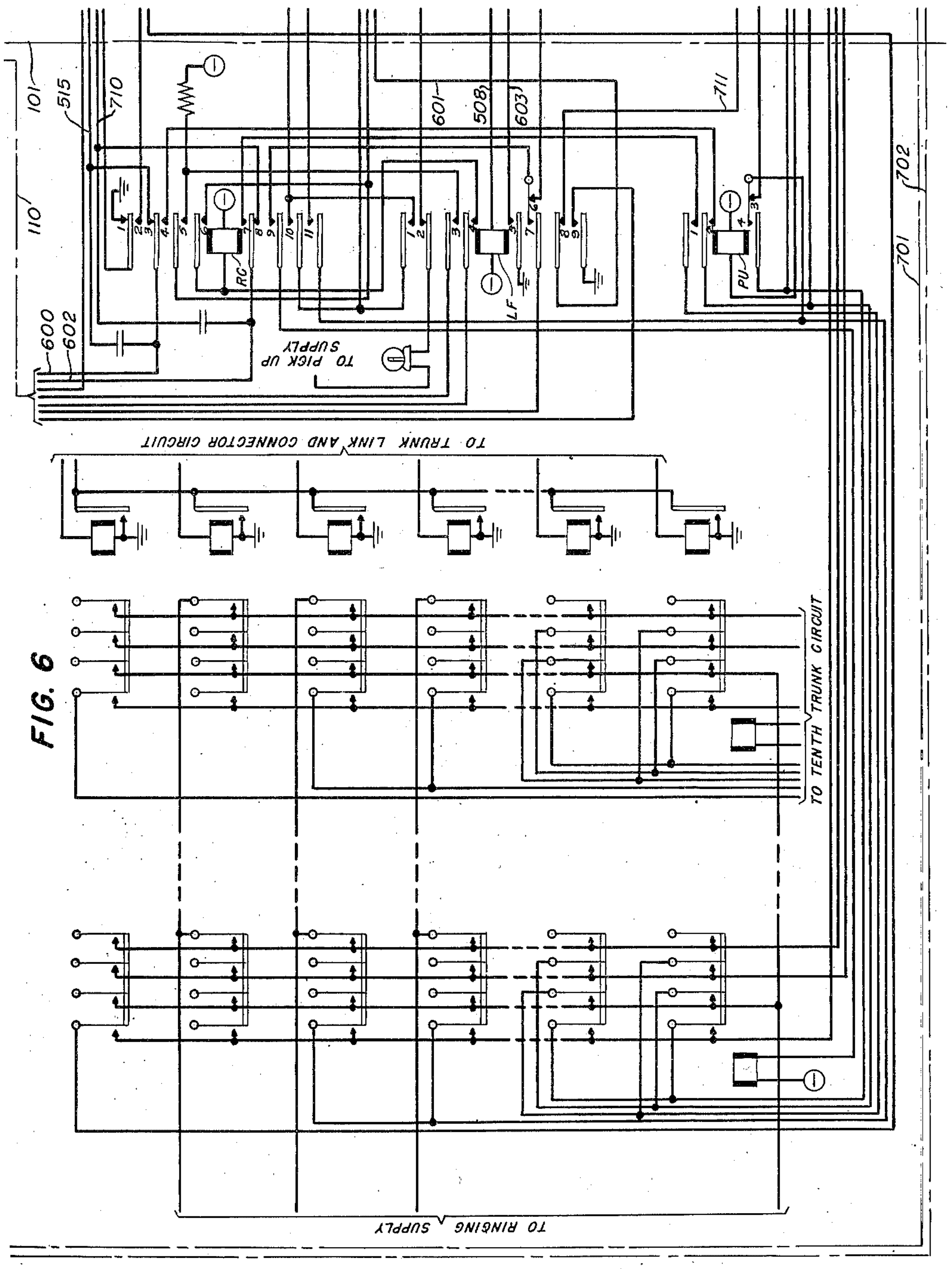
Figure 7:
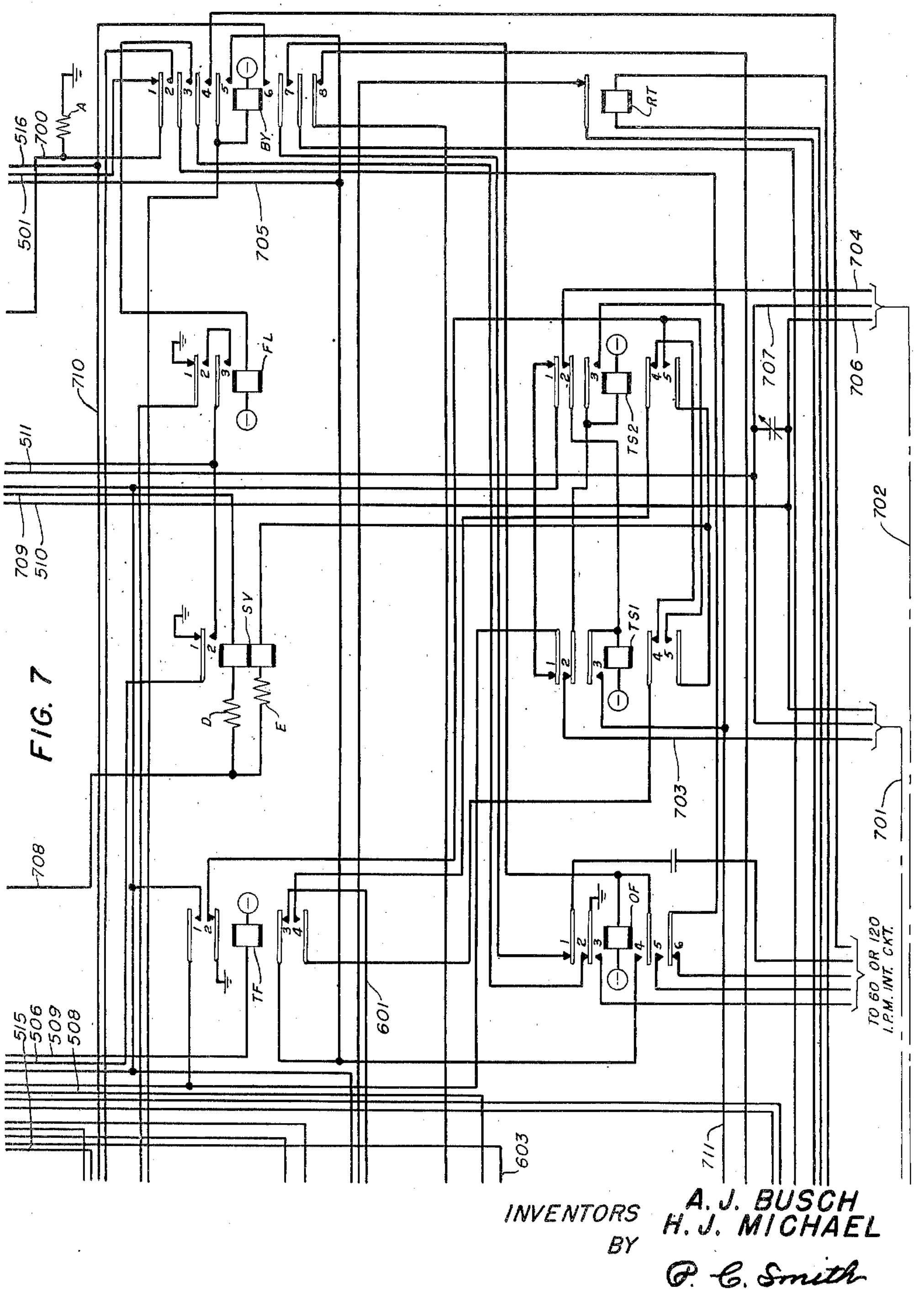

The incoming trunk of Figs. 5 and 7 and the right-hand part of Fig. 6 is arranged for dial pulsing as distinguished from the well-known multifrequency pulsing. When this trunk is seized at a remote location, ground is connected to lead 500, over contact 2 of jack B(5) to battery through the winding of relay E(5), operating relay E(5). Relay E(5), upon operating, completes a circuit for operating relay IN(5) from ground, over contact 4 of relay E(5) to battery through the winding of relay IN(5). Relay IN(5), upon operating, completes a circuit from battery, through resistance lamp B(5), over contact 1 of relay RV(5), contact 2 of relay IN(5), contact 5 of relay D(5), conductor 501, contact 1 of relay BY(7), conductor 700, contact 1 of jack B(5) and over conductor 502 to the remote signaling location. Previous to the operation of relay IN(5), conductor 502 was grounded over conductor 700, and through resistance A(7). The transfer from ground to battery on conductor 502, upon the operation of relay IN(5), as above, is a "stop-dial" signal to the remote location. This signal will be effective at the calling location to stop or delay the transmission to the trunk of dialing until, as will be described hereinafter, a so-called "start-dial" signal is transmitted to the calling location. Relay IN(5), upon operating, completes a circuit for operating the preference relay for this trunk in the associated incoming register link circuit of Figs. 8 and 9. Such circuit extends from battery, through resistance F(5), over contact 4 of relay IN(5), contact 4 of relay D(5), contact 3 of relay CO(5), conductor 503, through cable 5—8A to Fig. 8, conductor 503, winding of trunk preference relay TP0(8) corresponding to this trunk circuit to ground. Relay TP0(8) operates and locks to ground over its contact 6 and opens at its contact 5 the working lead for all other preference relays TP–(8) to permit only one call to proceed at any one time.

Figure 8:
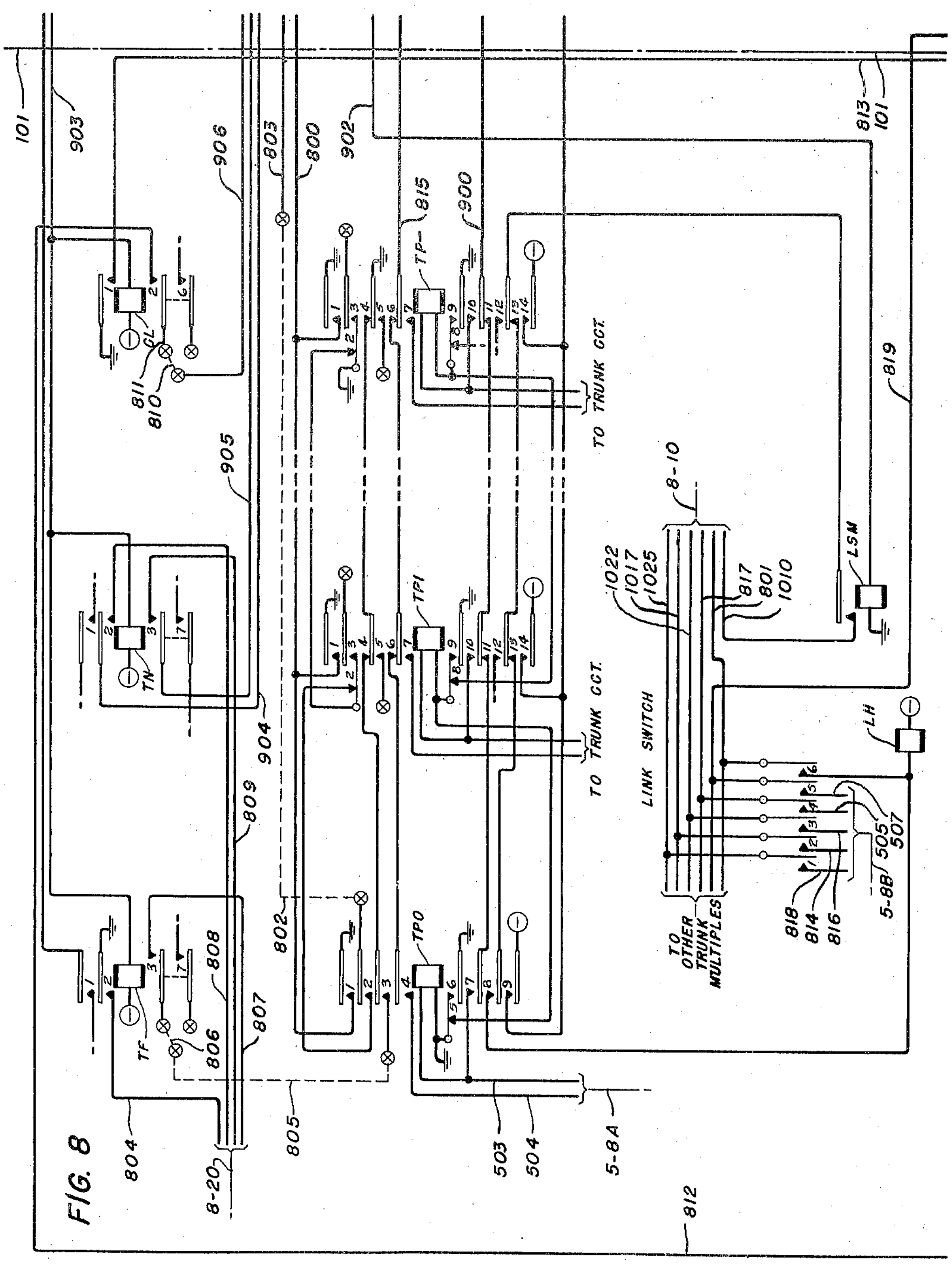
Figure 9:
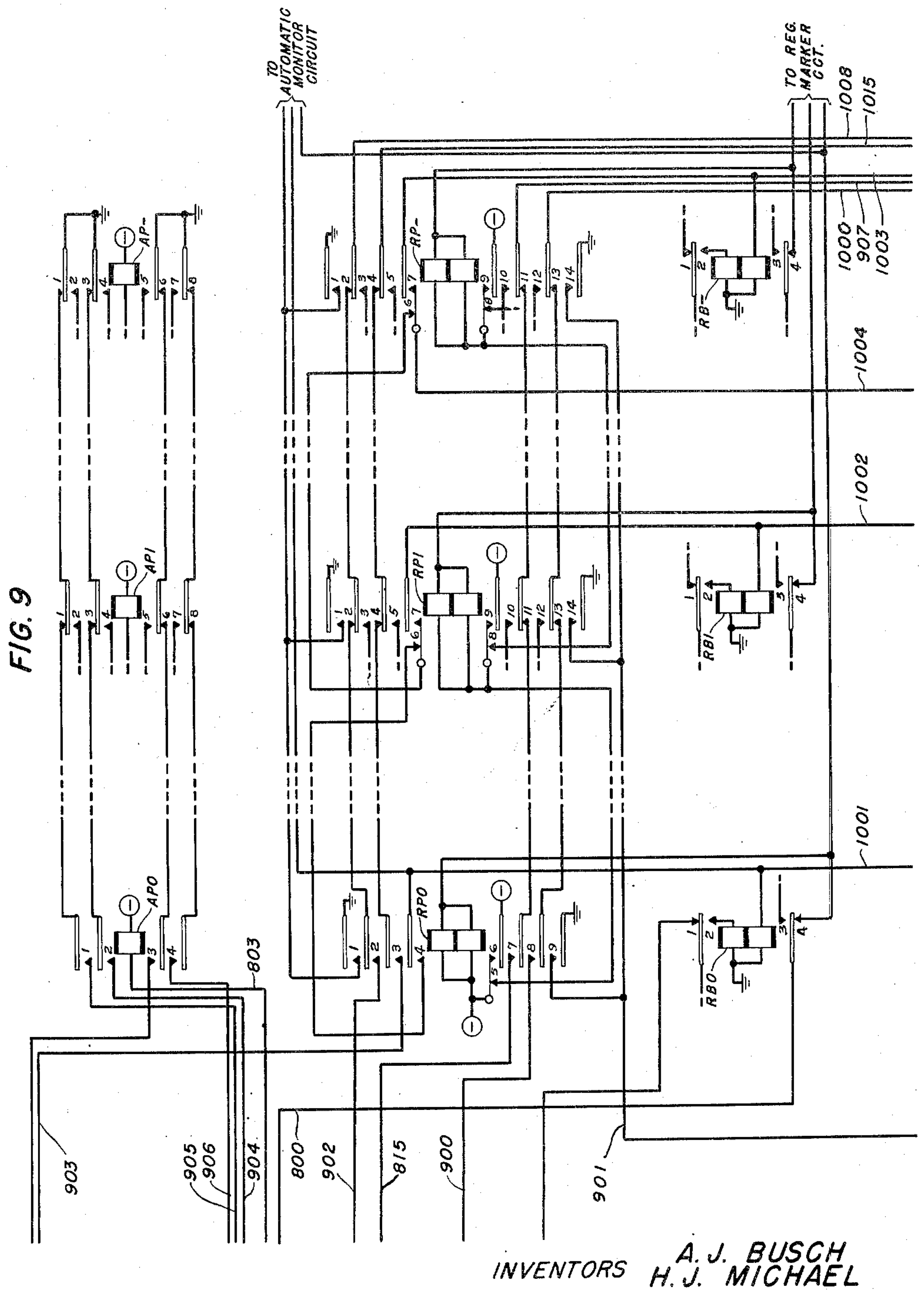
Figure 10:
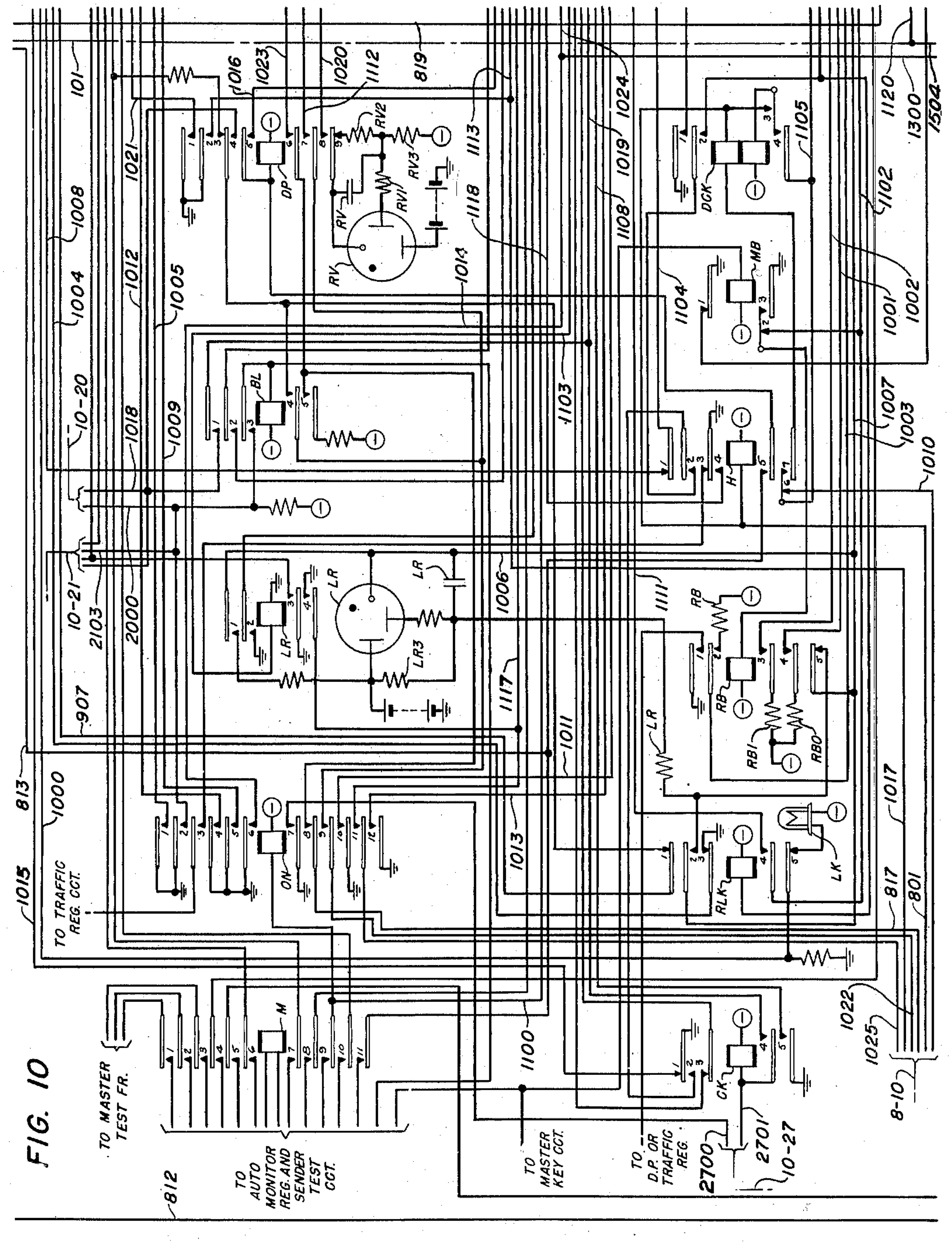
Figure 11:
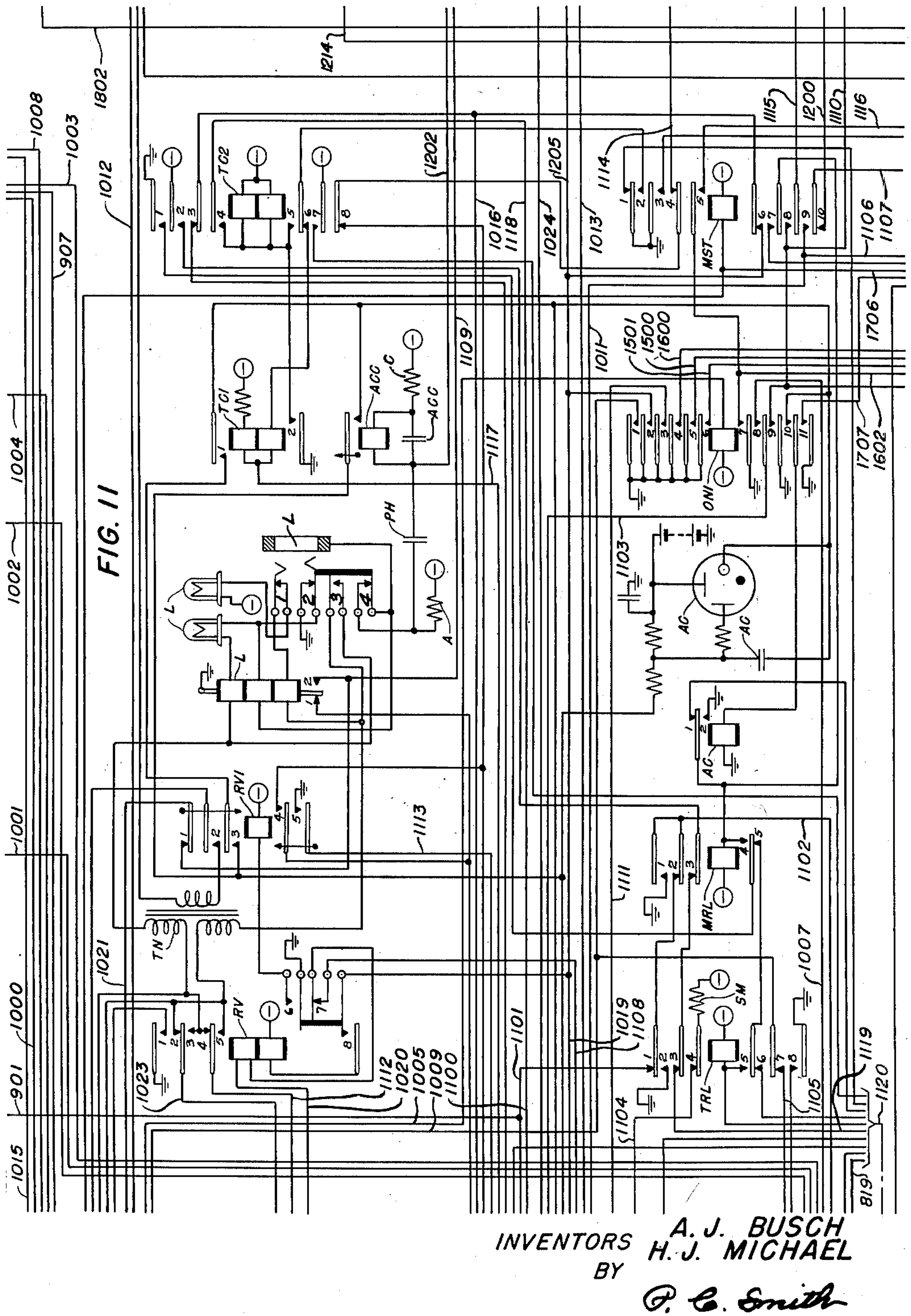

Relay TP0(8), upon operating, initiates the selection and seizure of an incoming register circuit by means of the incoming register link circuit of Figs. 8 and 9. Relay TP0(8) completes a circuit for operating a register preference relay RP0(9) from ground, over contact 1 of relay TP0(8), conductor 800, contact 4 of relay RB0(9), to battery through the windings of relay RP0(9). Relays RB–(9) are register busy relays and an operated relay RB–(9) indicates that the associated incoming register is busy. If the register associated with relay RB0(9) had been busy the start conductor 800 would have been transferred over contact 3 of relay RB0(93 to another RB relay (not shown) where it would have been steered to another RP relay (not shown) associated with another incoming register circuit. The relays RP1(9) and RB1(9) are associated with the same incoming register as are relays RP0(9) and RB0(9) but are associated with a different chain of trunk preference relays TP-(8). Relays RP1(9), RB1(9), RP-(9) and RB-(9), while associated with different trunk preference chains and with the same incoming register, are each arranged in register preference and busy chains for all registers, etc. It has been assumed that the incoming register shown in Figs. 10 through 22 is idle, represented by released relays RB0(9), RB1(9) and RB-(9), etc.

Relay RP0(9) will operate in the above circuit, locking to battery over its contact 6 and opening at its contact 5 the operating circuits for all other relays RP-(9) associated with the same register to permit but one call at a time to be handled by a particular incoming register. The operation of relay RP0(9) completes a locking circuit for relay TP0(8) controlled from the incoming register and extending from battery, through resistance lamp LK(10), over contact 5 of relay RLK(10), conductor 1000, contact 13 of relay RP-(9), contact 13 of relay RP1(9), contact 8 of relay RP0(9), conductor 900, contact 11 of relay TP-(8), contact 11 of relay TP1(8), contact 7 of relay TP0(8), through the winding of relay TP0(8), to ground over contact 6 of relay TP0(8). This locking path provides the incoming register with control of the trunk preference and register preference relays TP-(8) and RP-(9).

Relay RP0(9), upon operating, provides a start signal to the incoming register extending from ground, over contact 9 of relay RP0(9), and over conductor 901, to operate the off-normal relay ON(10) and the register busy relay RB(10) in the incoming register circuit. The circuit for relay ON(10) extends from ground, as above traced, over conductor 901, conductor 1100, to battery through the winding of relay ON(10), which relay thereupon operates. The circuit for relay RB(10) extends from ground over conductor 901, conductor 1101, contact 1 of relay TRL(11), contact 2 of relay MRL(11), conductor 1102, contact 2 of relay MB(10), to battery through the winding of relay RB(10), which thereupon operates. The operation of relay RB(10) completes operating circuits for all register busy relays RB-(9) associated with this incoming register. These circuits extend from battery through resistances RB0(10) and RB1(10) and RB-(10), contacts 4 and 3 and 2 of relay RB(10), conductors 1001 and 1002 and 1003, to ground through the windings of respective relays RB0(9) and RB1(9) and RB-(9). Relays RB1(9) and RB-(9) will operate in their circuits but relay RB0(9) cannot operate since the right-hand side of its winding is shunted to ground in a circuit extending from ground over contact 3 of relay RLK(10), conductor 1004, contact 6 of relay RP-(9), contact 6 of relay RP1(9), contact 4 of relay RP0(9) to the winding of relay RB0(9). As previously explained, the operations of relays RB1(9) and RB-(9) transfer the start conductors to other registers.

Relay ON(10), upon operating, operates relay ON1(11) in a circuit extending from ground over contact 1 of relay ON(10), conductor 1005, to battery through the winding of relay ON1(11). Relay RB(10), in operating, opened at its contact 5 a resistance shunt across condenser LR(10) such that upon the operation of relay ON1(11) a circuit is completed for permitting condenser LR(10) to acquire a charge. This circuit may be traced from battery, through resistance LR3(10), condenser LR(10), conductor 1006, conductor 1007, contact 8 of relay ON1(11), conductor 1103, to ground through the winding of relay LR(10). The charging time of condenser LR(10) measures a time interval within which certain operations associated with the register link control relays should take place. If such operations have not been completed within the allotted time, the charge on condenser LR(10) will fire tube LR(10) to thereby operate relay LR(10) over the previously traced charging circuit for condenser LR(10) under the control of relay ON1(11). The operation of relay LR(10) calls in a marker for a trouble record and releases the link circuit. It will be assumed that the operations mentioned are completed within the allotted time such that relay LR(10) does not operate.

In the meantime the link select magnet LSM(8) for the selected incoming register is operated in a circuit extending from battery, through resistance SM(11), over contact 4 of relay TRL(11), conductor 1104, contact 1 of relay H(10), conductor 1008, contacts 2 of relays RP-(9) and RP1(9) and RP0(9) etc., conductor 902, to ground through the winding of the select magnet LSM(8). Select magnet LSM(8), upon operating, completes a circuit for operating the link hold magnet LH(8) corresponding to the trunk circuit which seized the incoming register. Such circuit may be traced from ground over contact 5 of off-normal relay ON(10), conductor 1009, and in parallel from ground over contact 1 of off-normal relay ON1(11), over contact 7 of relay TRL(11), conductor 1105, contact 6 of relay H(10), conductor 1010, through cable 8—10 to Fig. 8, conductor 1010, contact of select magnet LSM(8), contact 13 of relay TP-(8), contact 13 of relay TP1(8), contact 8 of relay TP0(8), to battery through the winding of hold magnet LH(8). Upon the operation of hold magnet LH(8), its operating ground is extended over contact 6 of the link switch, conductor 801, through cable 8—10 to Fig. 10, conductor 801 to battery through the winding of relay H(10). Relay H(10), upon operating, locks in series with the upper winding of relay DCK(10) to off-normal ground over contact 7 of relay H(10) on conductor 1105. Relay DCK(10) operates over this circuit and locks to off-normal ground on conductor 1105 from battery through its lower winding over its contact 4. Relay H(10), upon operating, opens at its contact 1 the operating circuit for the select magnet LSM(8) which thereupon releases. Relay H(10) also opens at its contact 6 the operating circuit for hold magnet LH(8). However, relay H(10) and hold magnet LH(8) are locked operated in a circuit extending from off-normal ground on conductor 1105, over contacts 4 and 3 of relay DCK(10), in parallel to battery through the winding of relay H(10) and over conductor 801, contact 6 of the link switch to battery through the winding of hold magnet LH(8).

The relay ON(10) upon operating, completed a circuit for operating relay TMA(17) to start a general timing cycle for the incoming register. Such circuit extends from ground over contact 10 of relay ON(10), conductor 1011, conductor 1106, through cable 14—17 to Fig. 17, conductor 1106, contact 2 of relay R0(17), contact 1 of relay TMB(17), to battery through the upper winding of relay TMA(17). Relay TMA(17) locks in a circuit extending from battery through its lower winding, over its contact 3 to conductor 1700 and relay TMB(17) operates from battery through its winding, over contact 4 of relay TMA(17) to conductor 1700, through cable 12—17 to Fig. 12, conductor 1700, contact 5 of relay RA1(12), which will have been operated by this time as will be explained hereinafter, conductor 1200, contact 10 of relay MST(11), conductor 1107, through cable 14—17 to Fig. 17, conductor 1107, contact 2 of relay R0(17), to the previously traced off-normal ground on conductor 1106. Relay TMB(17), in operating, opens the operating circuit for relay TMA(17). As will be seen later, relay RA1(12) operates and releases many times during the registration of information in the incoming register. Each time relay RA1(12) releases, relay TMA(17) will release and relay TMB(17) will start to release; but relay TMB(17) has a retarded releasing action to prevent relay TMA(17) from reoperating for a specified duration of time. When relay TMA(17) operated initially, condenser TM(17) started to acquire a charge in a circuit from battery, through resistance TM3(17), over contact 1 of relay OVL(17), through condenser TM(17), contact 2 of relay TMA(17), to ground through the winding of relay TM(17). If relay TMA(17) remains operated for a sufficient duration of time, due to the failure of relay RA1(12) to release, the charge on condenser TM(17) will fire tube TM(17) to thereby operate relay TM(17) in series therewith over contact 2 of relay TMA(17). The operation of relay TM(17) operates reorder relay R0(17) in a circuit from off-normal ground on conductor 1106 in Fig. 17, over contact 1 of relay TM(17), to battery through the winding of relay R0(17), which operates and locks over its contact 3 to ground on conductor 1106. The operation of relay R0(17) will effect a reorder condition in the trunk circuit and a recycling of the TM(17) timing circuit. If tube TM(17) fires again, the register circuit will be released to normal and a trouble record taken.

It will be assumed that tube TM(17) does not fire because of the timely releases of relay TMA(17), in response to proper operation and release of relay RA1(12) in the trunk, to discharge condenser TM(17) through resistance TM2(17).

Relay ON(10), upon operating, also operates relays RA(12) and AS(13). The circuit for relay RA(12) may be traced from ground over contact 4 of relay ON(10), conductor 1012, contact 1 of relay LA(12), to battery through the winding of relay RA(12). The circuit for relay AS(13) extends from ground, over contact 12 of relay ON(10), conductor 1013, contact 7 of relay P2A(12), conductor 1201, through cable 12—13 to Fig. 13, conductor 1201, to battery through the winding of relay AS(13). Relay AS(13) locks over its contact 6, contact 6 of relay BS(13), conductor 1300, conductor 1014, to ground over contact 6 of relay ON(10).

*Trunk frame, trunk number and class identification*

With relay TP0(8) operated, as previously described, a circuit was completed for operating an auxiliary trunk preference relay AP0(9) extending from ground, over contact 2 of relay TP–(8), contact 2 of relay TP1(8), contact 2 of relay TP0(8), cross-connection 802, conductor 803, to battery through the winding of relay AP0(9). When relay RP0(9) operated, as above described, a circuit was completed for operating in parallel the trunk frame relay TF(8), the trunk number relay TN(8), and the class relay CL(8). This circuit extends from ground over contact 1 of relay CK(10), conductor 1015, contacts 4 of relays RP–(9) and RP1(9), contact 3 of relay RP0(9), conductor 903 in parallel to batteries through the windings of relays TF(8), TN(8) and CL(8).

Upon the operation of relay TF(8), the tens and units digits 0 of the trunk-link frame upon which the incoming trunk terminates is registered in the incoming register. Relay FG0(27) is operated, to register the tens digit 0, in a circuit extending from ground, over contact 2 of relay TF(8), conductor 804, through cable 8—20 to Fig. 20, conductor 804, to battery through the winding of relay FG0(27) Relay FG0(27) operates and locks in a circuit over its own contact 1, conductor 2700, through cable 10—27 to Fig. 10, conductor 2700, to ground over contact 7 of relay ON(10). Relay TF0(27) is operated, to register the units digit 0, in a circuit extending from ground over contacts 4 of relays TP–(8) and TP1(8), contact 3 of relay TP0(8), cross-connections 805 and 806, contact 3 of relay TF(8), conductor 807, through cable 8—20, conductor 807, to battery through the winding of relay TF0(27), which relay operates and locks over its contact 1 to off-normal ground previously traced over conductor 2700.

Upon the operation of relay TN(8), the tens and units digits 0 of the trunk number are registered in the incoming register. Relay LT0 (20) is operated, to register the tens digit 0, in a circuit extending from ground, over contacts 3 of relays AP–(9) and AP1(9), contact 2 of relay AP0(9), conductor 904, contact 2 of relay TN(8), conductor 808, through cable 8—20, conductor 808, to battery through the winding of relay LT0(20). Relay LT0(20) operates and locks in a circuit over its own contact 2, conductor 2000, through cable 10—20, conductor 2000, to ground over contact 2 of relay ON(10). Relay LU0(20) is operated, to register the units digit 0, in a circuit extending from ground over contacts 1 of relays AP–(9), AP1(9) and AP0(9), conductor 905, contact 3 of relay TN(8), conductor 809, cable 8—20, conductor 809, to battery through the winding of relay LU0(20), which relay operates and locks over its contact 1 to off-normal ground previously traced over conductor 2000.

Upon the operation of relay CL(8), the class relay TAN(19) and the relay DP(10) are operated to register the class of the connection and the type of pulsing trunk connected (direct pulsing assumed) to the incoming register. The class relay TAN(19) is operated in a circuit extending from ground over contacts 8 of relays AP–(9) and AP1(9), contact 4 of relay AP0(9), conductor 906, cross-connection 810, conductor 811, contact 2 of relay CL(8), conductor 812, cross-connection 2100, conductor 2101, cable 19—21, conductor 2101, to battery through the winding of class relay TAN(19). Relay TAN(19) operates and locks in a circuit over its own contact 7, conductor 1900, conductor 2102, conductor 2103, cable 10—21, conductor 2103, to ground over contact 2 of relay ON(10). Relay DP(10) is operated in a circuit extending from ground, over contact 1 of relay CL(8), conductor 813, contact 5 of relay H(10), to battery through the winding of relay DP(10). Relay DP(10) operates and locks in a circuit extending over its own contact 5, conductor 1016, contact 6 of relay MST(11), to ground over contact 2 of relay ON1(11).

Relay DP(10), upon operating, completes a circuit for operating relay C0(5) of the incoming trunk circuit extending from ground, over contact 2 of relay DP(10), conductor 1017, cable 8—10, conductor 1017, contact 2 of the link switch of Fig. 8, conductor 814, cable 5—8B, conductor 814, contact 3 of relay D(5), contact 5 of relay C0(5), to battery through the winding of relay C0(5). Relay C0(5) operates and locks in a circuit over its own contact 6, contact 8 of relay D(5), to ground over contact 3 of relay IN(5). Relay IN(5) is provided with a holding path independent of relay E(5) over contact 1 of relay D(5); contact 4 of relay C0(5), contact 3 of relay D(5), to the ground on conductor 814 previously traced as the operating ground of relay C0(5).

Relay C0(5), upon operating, opens at its contact 3 the start conductor which operated relay TP0(8), which relay TP0(8) is locked, however, as previously described, under control of the incoming register circuit.

Relay C0(5), upon operating, completes a checking circuit for operating relay CK(10) as an indication that the trunk frame number (relays FG0(27) and TF0(27)), the trunk number (relays LT0(20) and LU0(20)), and the class of connection (relay TAN(19)) have been registered in the incoming register circuit. The latter check circuit extends from ground, over contact 2 of relay C0(5), conductor 504, cable 5—8A, conductor 504, contact 4 of relay TP0(8), contacts 6 of relays TP1(8) and TP–(8), conductor 815, contact 7 of relay RP0(9), contact 11 of relay RP1(9), contact 10 of relay RP–(9), conductor 907, contact 1 of relay RLK(10), contact 4 of relay DP(10), conductor 1018, cable 10—20, conductor 1018, contact 2 of relay LU0(20), contact 4 of relay LT0(20), conductor 2001, contact 5 of relay TAN(19), conductor 1901, conductor 2104, conductor 2105, contact 2 of relay TF0(27), contact 2 of relay FG0(27), conductor 2701, cable 10—27, conductor 2701, to battery through the winding of relay CK(10). Relay CK(10) operates and locks in a circuit over its own contact 4, conductor 1019, to ground over contact 2 of relay ON1(11).

Relay CK(10), upon operating, among other functions to be described hereinafter, opens at its contact 1 the previously traced operating circuit for relays TF(8), TN(8), and CL(8), which relays thereupon release.

*Preparation of trunk and incoming register for pulsing*

Relay DP(10), upon operating, operates relay LA(12) and relay ACC(11) in a circuit extending from ground over contact 1 of relay DP(10), conductor 1021, contact 1 of relay RV1(11), conductor 1109, through the winding of relay LA(12), conductor 1202, through the winding of relay ACC(11), to battery through resistance C(11), Relay LA(12), upon operating, opens at its contact 1 the previously traced circuit for operating relay RA(12), thereby releasing that relay, and closes at contact 2 of relay LA(12) an obvious circuit for operating relay LB(12). Relay RA(12), in releasing, completes a circuit for operating relay RA1(12) extending from ground, over contact 9 of relay ON1(11), conductor 1110, contact 1 of relay RA(12), to battery through the winding of relay RA1(12).

Relay DP(10), upon operating, removes, at its contact 9, the discharging resistance RV2(10) from in shunt of condenser RV(10). Condenser RV(10) acquires a charge in a circuit extending from ground, over contact 5 of relay CK(10), conductor 1108, contact 7 of relay RV(11), through the upper winding of relay RV(11), conductor 1020, contact 8 of relay DP(10), condenser RV(10), to battery through resistance RV3(10). A time delay will result before condenser RV(10) acquires sufficient charge to fire tube RV(10) to thereby operate relay RV(11).

In the meantime, upon the operation of relay CK(10), above described, a circuit was completed for operating relay RLK(10) extending from ground, over contact 2 of relay CK(10), contact 2 of relay H(10), contact 2 of relay DCK(10), to battery through the winding of relay RLK(10). Relay RLK(10), upon operating its contact 2, places resistance LR(10) in shunt of condenser LR(10) to discharge said condenser and stop the timing cycle of the LR timer which, as previously described, times for completion of certain operations associated with relay control circuits of the link switch of Fig. 8. Relay RLK(10) also completes holding circuits for relays RB(10) and ON(10) prior to release of the register preference relay RP0(9). This circuit extends from ground, over contact 3 of relay ON1(11), conductor 1111, contact 4 of relay RLK(10), over contact 2 of relay MB(10) to battery through the winding of relay RB(10), and over conductor 1102, contact 2 of relay MRL(11), contact 1 of relay TRL(11), conductor 1101 and conductor 1100 to battery through the winding of relay ON(10). Relay RLK(10), upon operating, opens at its contact 1 the operating circuit for relay DP(10), which relay, however, is locked operated, as previously described. At its contact 3, relay RLK(10) removes the ground shunt on the right-hand side of the winding of relay RB0(9) to permit relay RB0(9) to operate to complete the operation of all relays RB0, 1, etc. in Fig. 9 pertaining to this incoming register to indicate the busy condition thereof to all other calls. At its contact 5 relay RLK(10) removes the locking battery for relay TP0(8) thereby permitting relay TP0(8) to release.

Relay RB0(9), upon operating, releases relay RP0(9) and relay TP0(8), upon releasing, releases relay AP0(9). The incoming register link circuit of Figs. 8 and 9 is thereby fully released to normal in order to handle another call. It will be appreciated, of course, that the link switch shown on the bottom of Fig. 8 is merely illustrative of a number of such cross bar switches and that the idle link circuit may effect interconnection thereby of any calling trunk and any idle incoming register in a manner similar to the foregoing description. It is further apparent that the register busy relays RB0(9), RB1(9), RB–(9), etc. will remain operated as long as the associated register is busy, thereby routing the operating circuits of relays RP0(9), RP1(9) and RP–(9), etc. to other RP relays associated with other registers.

The incoming trunk circuit and the incoming register circuit remain interconnected over the link switch shown in Fig. 8 under control of the hold magnet LH(8), which, in turn, as previously described, is held operated under the control of the off-normal relay ON(10) in the register circuit.

As soon as condenser RV(10) acquires sufficient charge to fire tube RV(10), as previously explained, tube RV(10) fires to thereby operate relay RV(11) in a circuit extending from battery, through tube RV(10), over contact 8 of relay DP(10), conductor 1020, through the upper winding of relay RV(11), contact 7 of relay RV(11), conductor 1108, to ground over contact 5 of relay CK(10). Relay RV(11) locks through its lower winding, its contact 8, to ground over contact 2 of relay ON1(11). Relay RV(11), upon operating, operates relay L(11) and relay RV(5). Relay L(11) is continuously (in normal position of contacts of the jack) L(11) energized in a circuit extending from ground, over contact 2 of jack L(11), through the middle winding of relay L(11), contact 4 of jack L(11), to battery through resistance A(11). This winding is energized to retain the armature in contact, as shown, with contact 1. Whenever the top and bottom windings of relay L(11) are not energized, the middle winding will return the armature to its normal position, as shown. Upon the operation of relay RV(11), as previously described, a circuit is completed for both top and bottom windings of relay L(11) and for relay RV(5) in series with the top winding of relay L(11). The circuit for the bottom winding extends from battery, through the resistance lamp L(11), contact 1 of jack L(11), bottom winding of relay L(11), through the lower left section of repeat coil TN(11), contact 5 of relay RV(11), conductor 1112, contact 7 of relay DP(10), contact 9 of relay ON(10), conductor 1022, cable 8—10, conductor 1022, contact 3 of the link switch, conductor 816, cable 5—8B, conductor 816, contact 5 of relay E(5), to ground through resistance C(5). The circuit for relay RV(5) and the top winding of relay L(11) extends from battery, through the winding of relay RV(5), contact 3 of relay RV(5), contact 1 of relay E(5), conductor 505, cable 5—8B, conductor 505, contact 4 of the link switch, conductor 817, cable 8—10, conductor 817, contact 8 of relay ON(10), contact 6 of relay DP(10), conductor 1023, contact 3 of relay RV(11), upper left section of repeat coil TN(11), top winding of relay L(11), resistance lamp L(11), to ground over contact 2 of jack L(11). Relays RV(5) and L(11) operate in these circuits. Relay RV(5) locks in a circuit over its contact 4 to ground over contact 3 of relay IN(5). Relay L(11), upon operating, grounds its contact 2 to hold relays LA(12) and ACC(11) operated when the operation of relay RV1(11) removes at its contact 1 the operating ground, previously traced, for relays LA(12) and ACC(11).

Relay RV1 (11) is slow to operate in order to permit relay L(11) to provide this holding path for relays LA(12) and ACC(11). After such delay, relay RV1(11) operates in an obvious circuit over contact 6 of relay RV(11). Relay RV1(11), upon operating, supplies ground over its contact 5, and conductor 1113, to supplement the ground applied over contact 2 of relay DP(10) to conductor 1017. Relay RV1(11), by virtue of this supplementary ground applied to conductor 1017, will hold relay IN(5) of the trunk circuit operated after the release of relay DP(10).

It will be remembered that before the operation of relay IN(5), ground was supplied over contact 1 of relay IN(5), contact 5 of relay D(5), conductor 501, contact 1 of relay BY(7), conductor 700, contact 1 of jack B, to conductor 502 to the originating remote signaling circuit. When relay IN(5) operated, as previously described, this ground was changed to battery over contact 2 of relay IN(5), contact 1 of relay RV(5), through resistance lamp B to battery. This change from ground to battery on conductor 502 was a "stop dial" or "delay dial" signal to the remote signaling circuit to stop or prevent transmission of dial pulses until the local equipment should be prepared to receive such dialing.

Upon the operation of relay RV(5), the battery on conductor 502 is removed and ground reapplied thereto over contact 2 of relay RV(5). This reapplication of ground to conductor 502 is recognized at the remote circuits as a "start dial" signal, whereupon the remote equipment will transmit to the local incoming trunk circuit the called subscriber's directory number. A dial pulse basis is shown and described in this disclosure, but it is possible to handle such dialing on other dialing basis, such, for instance, as multifrequency signaling.

*Registration of called number*

Each time conductor 500 is removed from ground at the remote calling point and returned to ground one pulse is transmitted to the incoming trunk by releasing and reoperating relay E(5). Each time relay E(5) releases and reoperates, it creates at its contacts 1 and 5 momentary openings in the previously traced circuits for the respective top and bottom windings of relay L(11). Relay L(11) will therefore release momentarily and reoperate in response to the releases and reoperations of relay E(5).

Upon the first release of relay L(11), relay LA(12) releases but relay ACC(11), being slow to release, holds operated during pulses of a digit but releases during the time interval between digits. Relay ACC(11), when operated, maintains an obvious shunt across condenser AC(11) of the abandoned call timer AC preventing the functioning of such timer to register an abandoned call. The release of relay LA(12) releases relay LB(12). The release of relay LA(12) reoperates relay RA(12) over the previously traced circuit. The operation of relay RA(12) releases relay RA1(12). Upon the first release of relay L(11), relay LC(12) operates in a circuit extending from ground over contact 1 of relay L(11), contact 4 of relay RV1(11), contact 8 of relay TC2(11), contact 4 of relay MST(11), conductor 1114, contact 1 of relay LE(12), to battery through the winding of relay LC(12). Relay LE(12) cannot operate in series with relay LC(12) because the upper side of its lower winding is grounded over its contact 1 and conductor 1114 just traced, while the bottom side of its lower winding is grounded over contact 1 of relay LD(12), contact 1 of relay LC(12), contact 2 of relay LB(12), to off-normal ground on conductors 1203 and 1012 previously traced.

Upon the first reoperation of relay L(11), at the end of the first pulse, ground is removed from conductor 1114 to remove the shunt across the lower winding of relay LE(12). Relay LE(12) thereupon operates in series with relay LC(12) in a circuit extending from battery through the winding of relay LC(12), lower winding of relay LE(12), contact 1 of relay LD(12), contact 1 of relay LC(12), contact 4 of relay RA(12), to off-normal ground on conductor 1203. The reoperation of relay L(11), reoperates relay LA(12), which transfers off-normal ground on conductor 1012 from the winding of relay RA(12) to the winding of relay LB(12), which latter relay operates. Relay RA(12) does not release during the inter-digital time.

During pulses of a digit, when relay RA(12) remains operated, a circuit is completed over either contact 3 or 4 of relay LE(12) for operating the pulse counting relays. Upon the first operation of relay LE(12), off-normal ground from conductor 1203 is supplied over contact 4 of relay RA(12), contact 4 of relay LE(12), contact 1 of relay P4(12), contact 1 of relay P2(12), contact 5 of relay P3(12) contact 6 of relay P5(12), to battery through the upper winding of relay P1(12), operating relay P1(12). Relay P1(12) locks in a circuit extending from battery, through the lower winding of relay P1(12), contact 4 of relay P1(12), contact 4 of relay P2(12), contact 2 of relay P3(12), contact 4 of relay P4(12), contact 2 of relay P5(12), contact 3 of relay RA1(12) to off-normal ground on conductor 1203.

The second release of relay L(11), during the dial break of the second pulse of the first digit, releases relays LA(12) and LB(12) as before. Relay LD(12) operates in series with the upper winding of relay LE(12) in a circuit extending from ground on conductor 1114, contact 2 of relay LE(12), upper windings of relays LE(12) and LD(12) to battery. The operation of relay LD(12) opens at its contact 1 the operating circuit for relay LC(12) which releases.

The second reoperation of relay L(11) reoperates relays LA(12) and LB(12) and releases relays LE(12) and LD(12) by removing ground from conductor 1114. Relay LE(12) in releasing applies off-normal ground from conductor 1203, over contact 4 of relay RA(12), over contact 3 of relay LE(12), contact 4 of relay RA1(12), contact 2 of relay P1(12), to battery through the winding of relay P2(12) and over conductor 1204, cable 12—19, conductor 1204, contact 2 of relay TAN(19), conductor 1902, cable 12—19, conductor 1902, contact 3 of relay P2A(12), to battery through the winding of relay P2A(12). Relays P2(12) and P2A(12) operate in these circuits. Relay P2(12) locks in a circuit over its contact 5, contact 2 of relay P3(12), contact 2 of relay P5(12), contact 3 of relay RA1(12) to off-normal ground over conductor 1203. Relay P2(12), in operating, opens at its contact 4 the holding circuit for relay P1(12) which thereupon releases. Relay P2A(12) locks in a circuit over its contact 4, conductor 1205 to off-normal ground over contact 2 of relay ON1(11). Relay P2A(12), in operation, opens at its contact 7 the operating circuit for relay AS(13), which relay however is locked operated as previously described. Relay P2A(12) closes at its contact 6 a circuit for operating relay EV(13) extending from ground, over contact 6 of relay P2A(12), conductor 1206, cable 12—13, conductor 1206, contact 9 of relay AS(13), contact 6 of relay OD(13), to battery through the winding of relay EV(13). Relay P2A(12) remains operated, having once operated as a result of more than one pulse in the first digit.

Relay EV(13) operates to steer the pulse count for even digits (A, C, E, G, etc.) into the even digit registers (A, C, E, G, J etc., of Figs. 15 and 16) over contacts of the even digit steering relays (AS(13), CS(13), ES(14), etc.). The relay OD(13) similarly steers the pulse count into the odd digit registers over contacts of the odd digit steering relays.

The above cycle repeats for each pulse of the first digit with relay RA(12) remaining operated and relay RA1(12) released. The second operation of relay LE(12), representing the third pulse, operates relay P3(12) in a circuit extending from ground over contact 4 of relay LE(12), contact 1 of relay P4(12), contact 2 of relay P2(12), to battery through the winding of relay P3(12). Relay P3(12) locks in a circuit over its contact 3, contact 4 of relay P4(12), contact 2 of relay P5(12), contact 3 of relay RA1(12), to off-normal ground on conductor 1203. Relay P3(12), upon operating, releases relay P2(12) by opening its locking circuit at contact 2 of relay P3(12). The second release of relay LE(12) representing the fourth pulse, operates relay P4(12) in a circuit extending from ground over contact 3 of relay LE(12), contact 4 of relay RA1(12), contact 1 of relay P3(12), to battery through the winding of relay P4(12). Relay P4(12) operates, releasing relay P3(12), and locks over its contact 5, contact 2 of relay P5(12), contact 3 of relay RA1(12) to off-normal ground on conductor 1203. The third operation of relay LE(12), representing the fifth pulse, operates relay P5(12) in a circuit extending from ground over contact 4 of relay LE(12), contact 2 of relay P4(12), to battery through the winding of relay P5(12). Relay P5(12) operates, releasing relay P4(12), and locks over contact 1 of relay P1(12), contact 3 of relay P5(12), contact 3 of relay RA1(12), to off-normal ground on conductor 1203. The third release of relay LE(12), representing the sixth pulse, operates relay P6(12) in a circuit extending from ground, over contact 3 of relay LE(12), contact 4 of relay RA1(12), contact 1 of relay P5(12), to battery through the upper winding of relay P6(12). Relay P6(12) operates and locks in a circuit through its lower winding, its contact 2, contact 3 of relay RA1(12), to off-normal ground on conductor 1203. Relay P6(12) operates relay P6A(12) in an obvious circuit over contact 1 of relay P6(12). Relay P5(12) remains locked under control of relays P1(12) and RA1(12). The fourth operation of relay LE(12), representing the seventh digit, operates relay P1(12) in a circuit extending from ground, over contact 4 of relay LE(12), contact 1 of relay P4(12), contact 1 of relay P2(12), contact 5 of relay P3(12), contact 4 of relay P6(12), to battery through the winding of relay P1(12). Relay P1(12) operates, releasing relay P5(12), and locks in the previously traced locking path. The fourth release of relay LE(12), representing the eighth pulse, operates relay P2(12) which locks and releases relay P1(12). The fifth reoperation of relay LE(12), representing the ninth pulse, operates relay P3(12) which locks and releases relay P2(12). The fifth release of relay LE(12), representing the tenth pulse, operates relay P4(12) which locks and releases relay P3(12). The following table summarizes which are the operated ones of the counting relays after the designated number of pulses:

| Pulse No. | Relays Operated |
|---|---|
| 1 | (P1) |
| 2 | (P2) (P2A) |
| 3 | (P3) (P2A) |
| 4 | (P4) (P2A) |
| 5 | (P5) (P2A) |
| 6 | (P5) (P6) (P6A) (P2A) |
| 7 | (P1) (P6) (P6A) (P2A) |
| 8 | (P2) (P6) (P6A) (P2A) |
| 9 | (P3) (P6) (P6A) (P2A) |
| 10 | (P4) (P6) (P6A) (P2A) |

At the end of any digit upon the reoperation of relays L(11), LA(12), and LB(12), relay RA(12) will release during the interdigital time. Certain of the counting relays will be locked under control of relay RA1(12) and, before relay RA1(12) can operate, off-normal ground over contact 9 of relay ON1(11) and conductor 1110 will be extended over contacts 2 and 3 of relay RA(12) and through contacts of the pulse counting relays to ground two-out-of-five leads 1207 to 1211 to the steering relays of Figs. 13 and 14 to register in the register relays of Figs. 15 and 16 the pulse content of each digit on a two-out-of-five basis. Relay RA1(12) then reoperates over its previously traced circuit over contact 1 of relay RA(12) to release all of the counting relays of Fig. 12.

It will be recalled that the assumed called subscriber's directory number to be transmitted to the incoming register was Chelsea 3-1245 representing the office code digits 243 and the numerals 1245. The first digit counted by the register will therefore be 2. This is indicated by the operation of relays P2(12) and P2A(12). When relay RA(12) releases, ground is applied from conductor 1110 over contact 3 of relay RA(12), contact 3 of relay P2(12), contact 3 of relay P6A(12), conductor 1207, cable 12—13, conductor 1207, contact 5 of relay EV(13), contact 5 of relay AS(13), conductor 1301, cable 13—15A, conductor 1301, to battery through the zero relay A0(15) of the "A" digit register. Relay A0(15) operates and locks over its contacts 1 and 2, conductor 1500, to ground over contact 5 of relay ON1(11). Ground on conductor 1110 is also applied over contact 2 of relay RA(12), contact 6 of relay P2(12), contact 6 of relay P6A(12), conductor 1209, cable 12—13, conductor 1209, contact 3 of relay EV(13), contact of 3 of relay AS(13), conductor 1302, cable 13—15A, conductor 1302, to battery through the winding of the two relay A2(15) of the "A" digit register. Relay A2(15) operates and locks over its contacts 1 and 2 to off-normal ground on conductor 1500.

When relay RA1(12) reoperates, as a result of the release of relay RA(12) during the inter-digital time, relay P2(12) is released, relay P2A(12) remaining locked under control only of relay ON1(11), as previously described. The re-operation of relay RA1(12) operates relay BS(13) in a circuit extending from ground over contact 6 of relay ON(10), conductor 1014, conductor 1024, contact 2 of relay RA1(12), conductor 1212, cable 12—13, conductor 1212, contact 7 of relay EV(13), contact 7 of relay AS(13), to battery through the winding of relay BS(13). Relay BS(13) operates and locks over its contact 7, contact 6 of relay CS(13), conductor 1300, to off-normal ground on conductor 1014. Relay RA1(12) provides a holding circuit for relay AS(13) extending from off-normal ground on conductors 1014 and 1024, contact 1 of relay RA1(12), conductor 1213, cable 12—13, conductor 1213, contact 9 of relay EV(13), contact 8 of relay AS(13), to battery through the winding of relay AS(13).

At the start of the pulse counting for the second digit, relay RA(12) reoperates and relay RA1(12) releases for the duration of the second digit which, in the assumed case, is 4. Upon the release of relay RA1(12) the relay AS(13) is released thereby opening, at contact 9 of relay AS(13), the operating circuit for relay EV(13), which releases. Relay EV(13), upon releasing, completes a circuit for operating relay OD(13) extending from ground, over contact 9 of relay BS(13), contact 6 of relay EV(13), to battery through the winding of relay OD(12). Immediately after the end of the second digit 4, relays P4(12), P2A(12) and RA(12) will be operated with relay RA1(12) released. Relay RA(12) will release to again ground two-out-of-five leads over its contacts 3 and 2. Ground over contact 3 of relay RA(12) extends over contact 3 of relay P4(12), contact 3 of relay P6A(12), conductor 1207, cable 12—13, conductor 1207, contact 5 of relay OD(13), contact 5 of relay BS(13), conductor 1303, cable 13—15B, conductor 1303, to battery through the winding of the zero relay B0(15) of the "B" digit register. Relay B0(15) operates and locks over its contacts 1 and 2 to off-normal ground on conductor 1500. Ground over contact 2 of relay RA(12) extends over contact 6 of relay P4(12), conductor 1210, cable 12—13, conductor 1210, contact 2 of relay OD(13), contact 2 of relay BS(13), conductor 1304, cable 13—15B, conductor 1304, to battery through the winding of the four relay B4(15) of the "B" digit register. Relay B4(15) operates and locks over its contacts 1 and 2 to off-normal ground on conductor 1500. The reoperation of relay RA1(12), as before, releases the pulse counting relays, operates relay CS(13) and locks relay BS(13). At the start of the third digit, the release of relay RA1(12) releases relay BS(13), which releases relay OD(13) and these two relays in releasing operate relay EV(13).

This cycle repeats for each digit such that at the end of the seven digits 243–1245 the following register relays are operated: EV(13), HS(14), GS(14), A0(15) and A2(15), B0(15) and B4(15), C1(15) and C2(15), D0(15) and D1(15), E0(15) E2(15), F0(16) and F4(16), and G1(16) and G4(16). And in the pulse counting circuit of Fig. 12 relays P2A(12), RA1(12), LA(12) and LB(12) will be operated.

*"A" digit translation*

Figure 18:
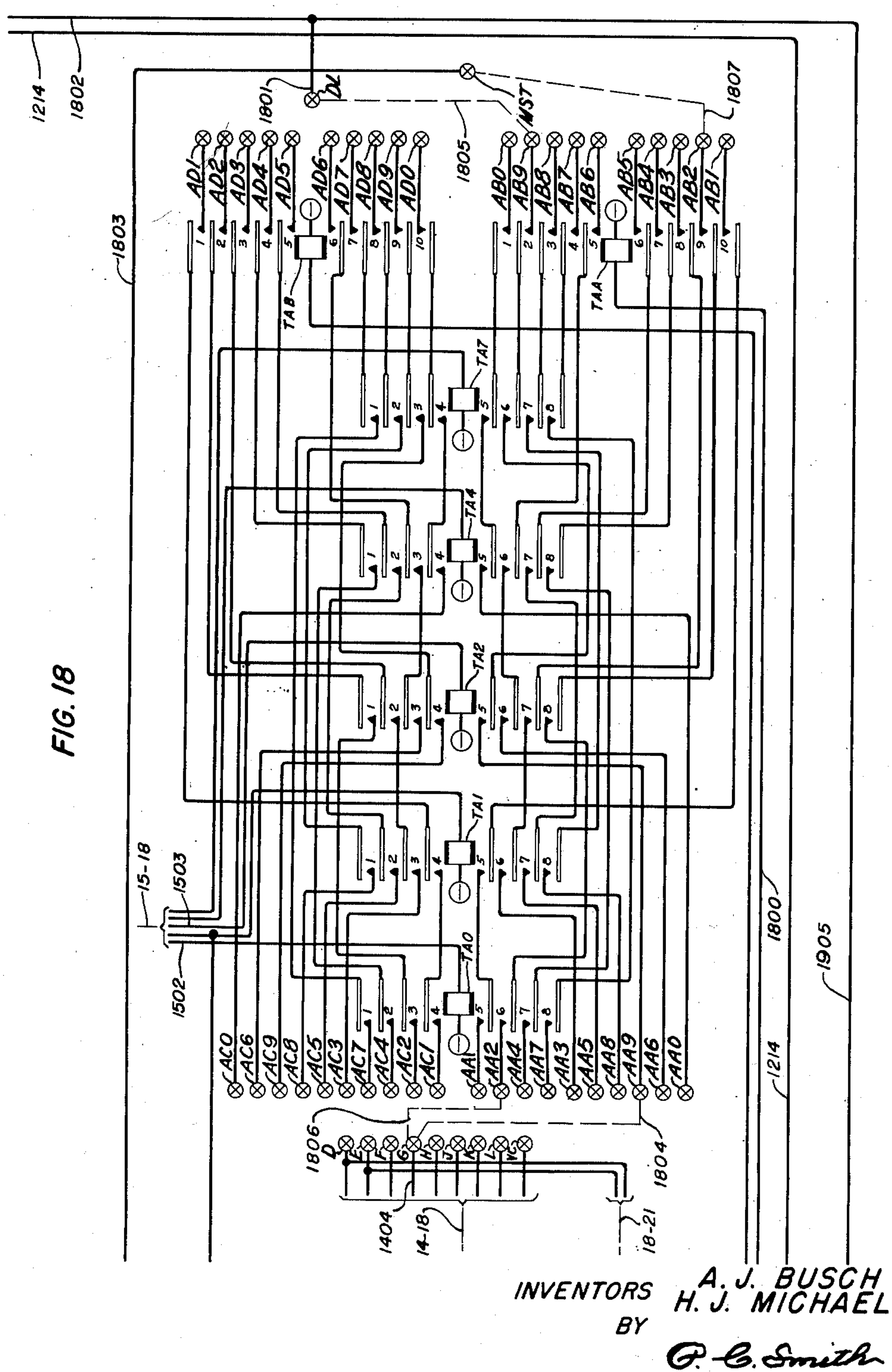
Figure 19:
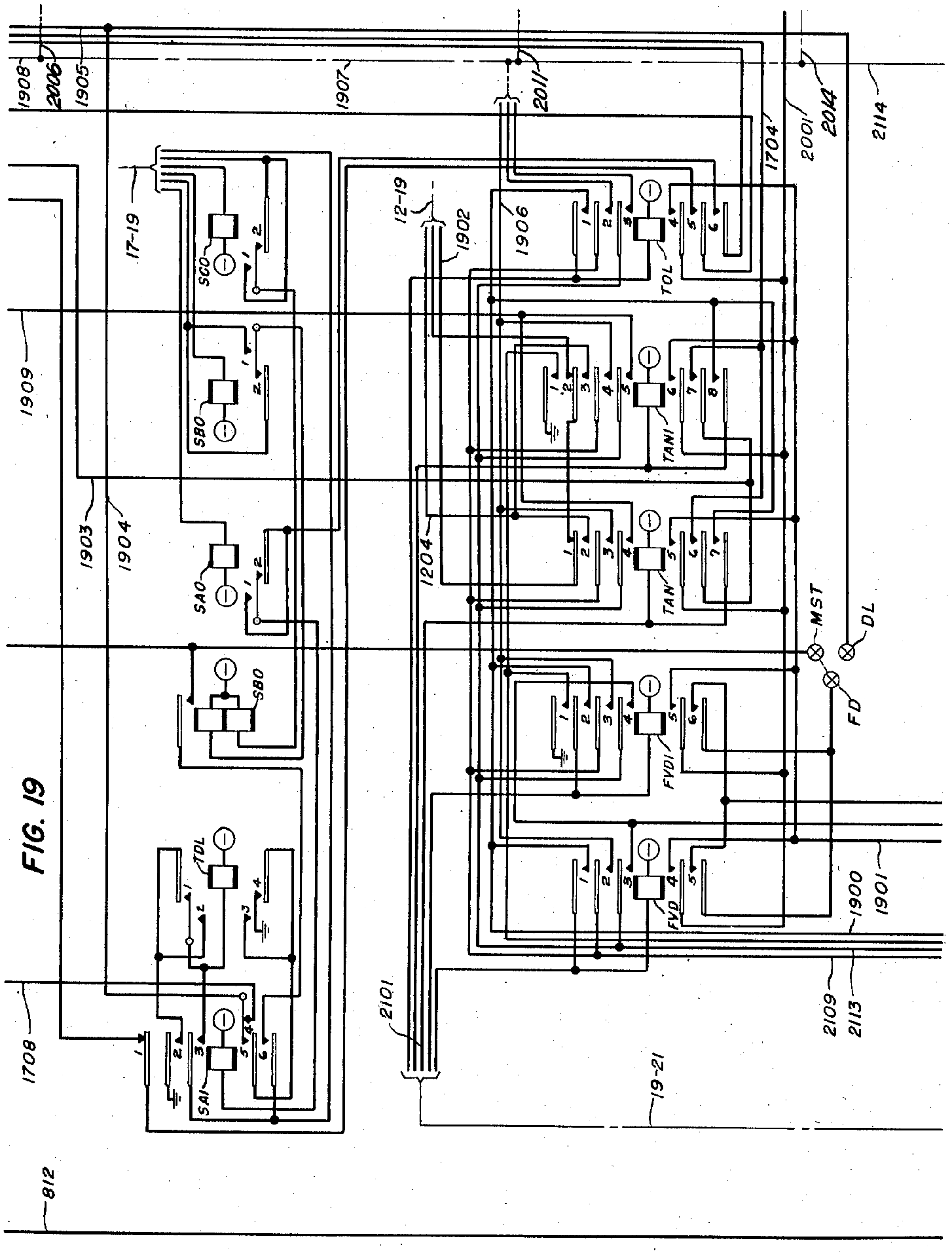
Figure 20:
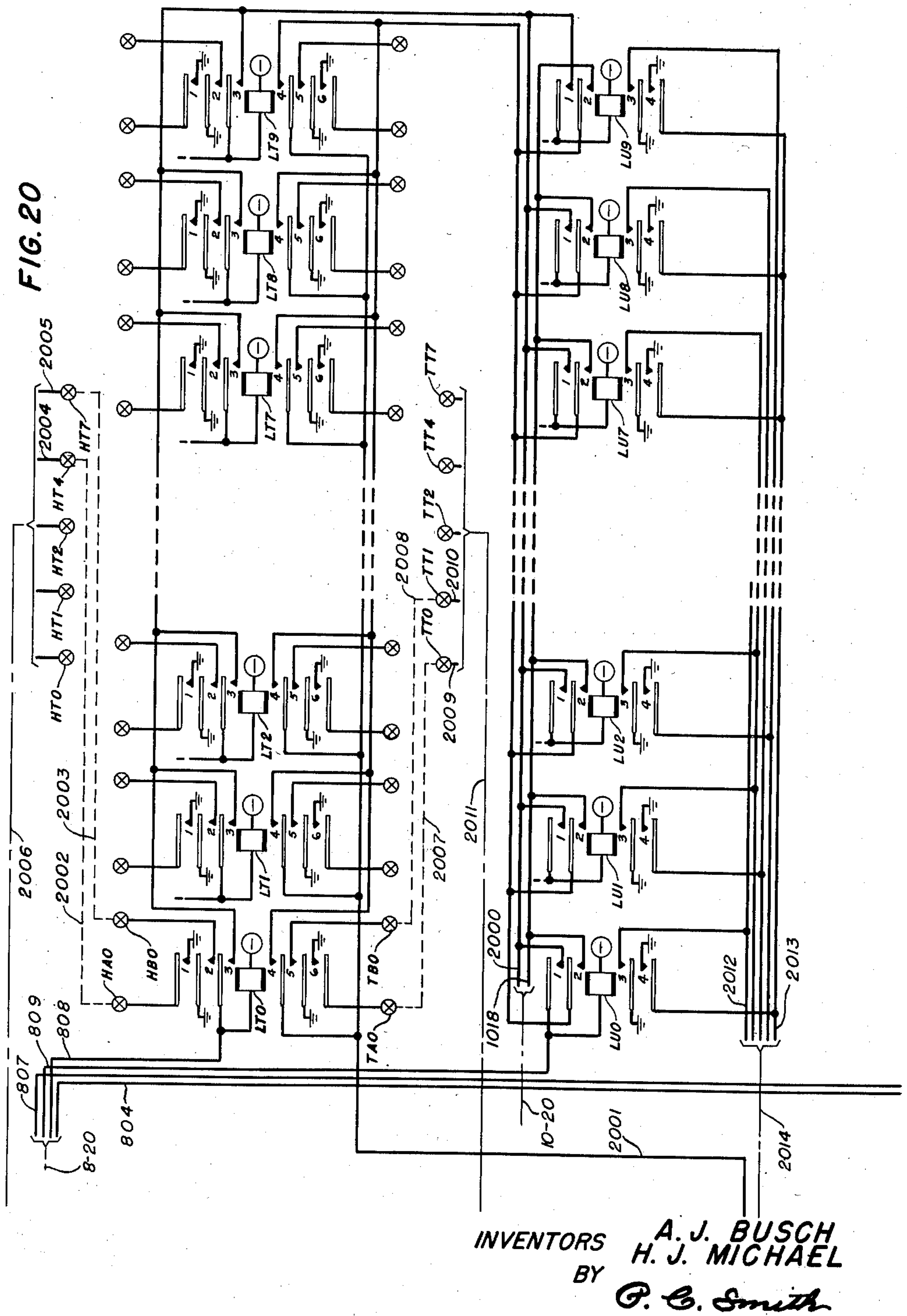
Figure 21:
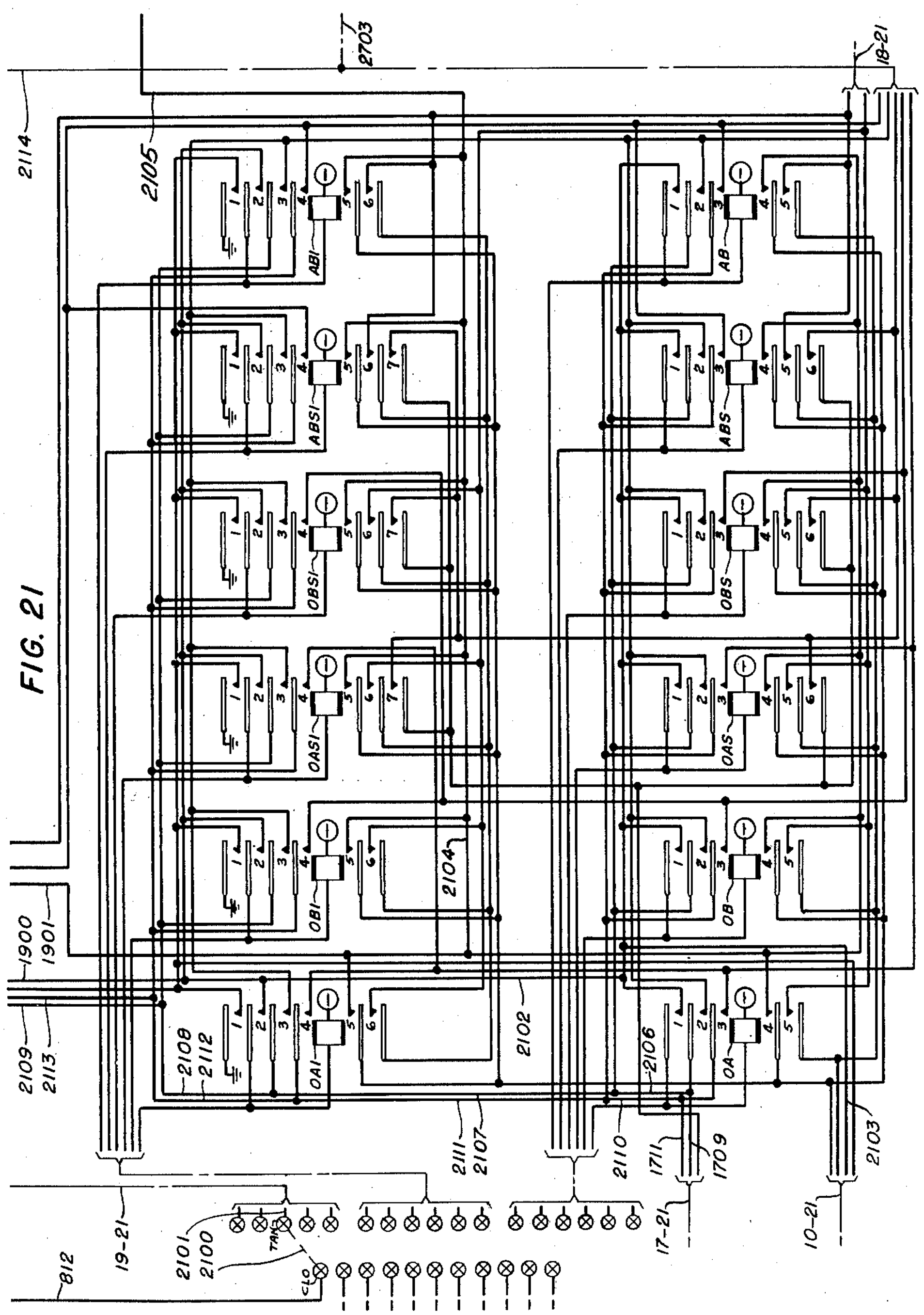
Figure 22:
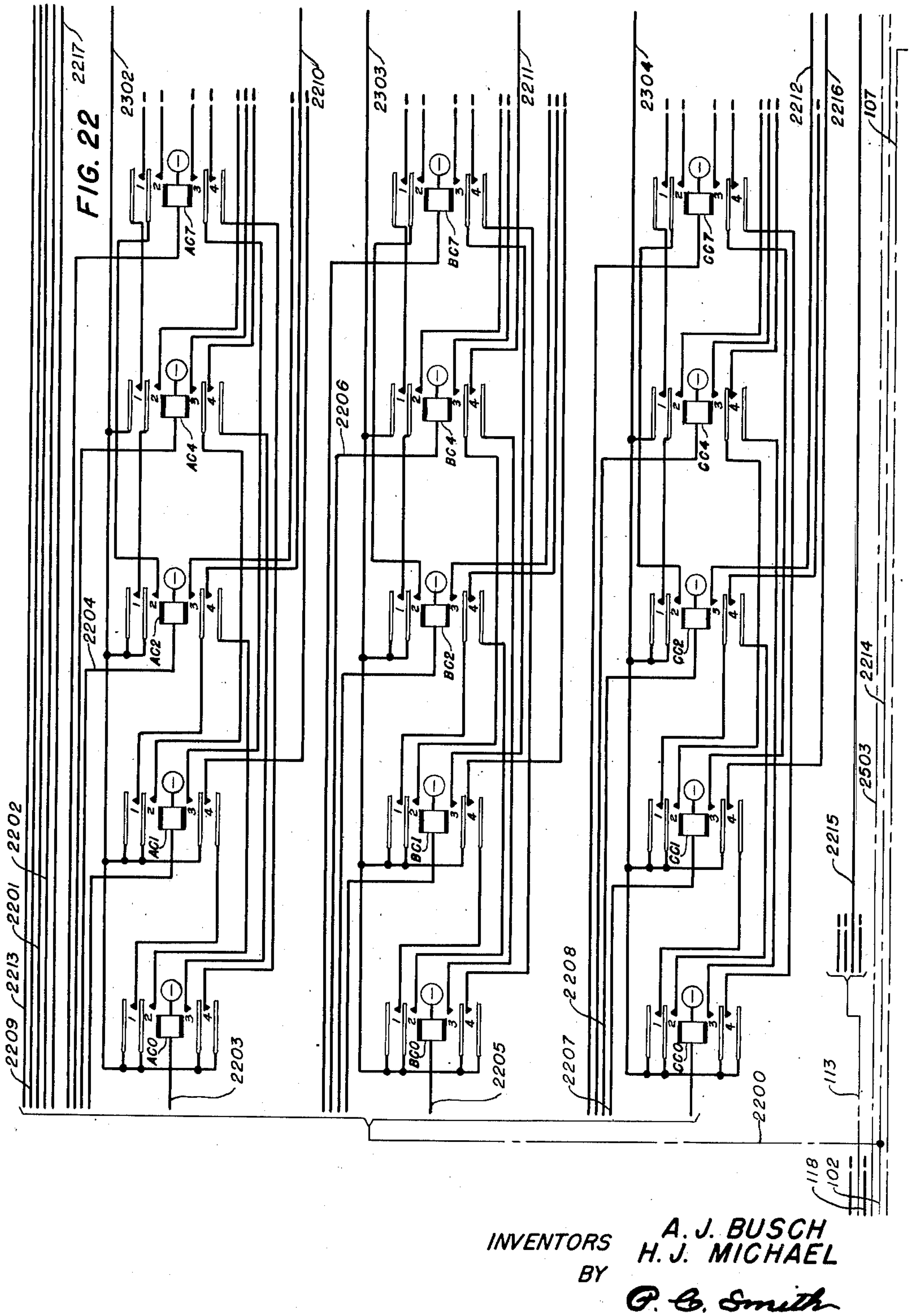
Figs. 22 through 26 show a skeletonized marker circuit.
Figure 23:
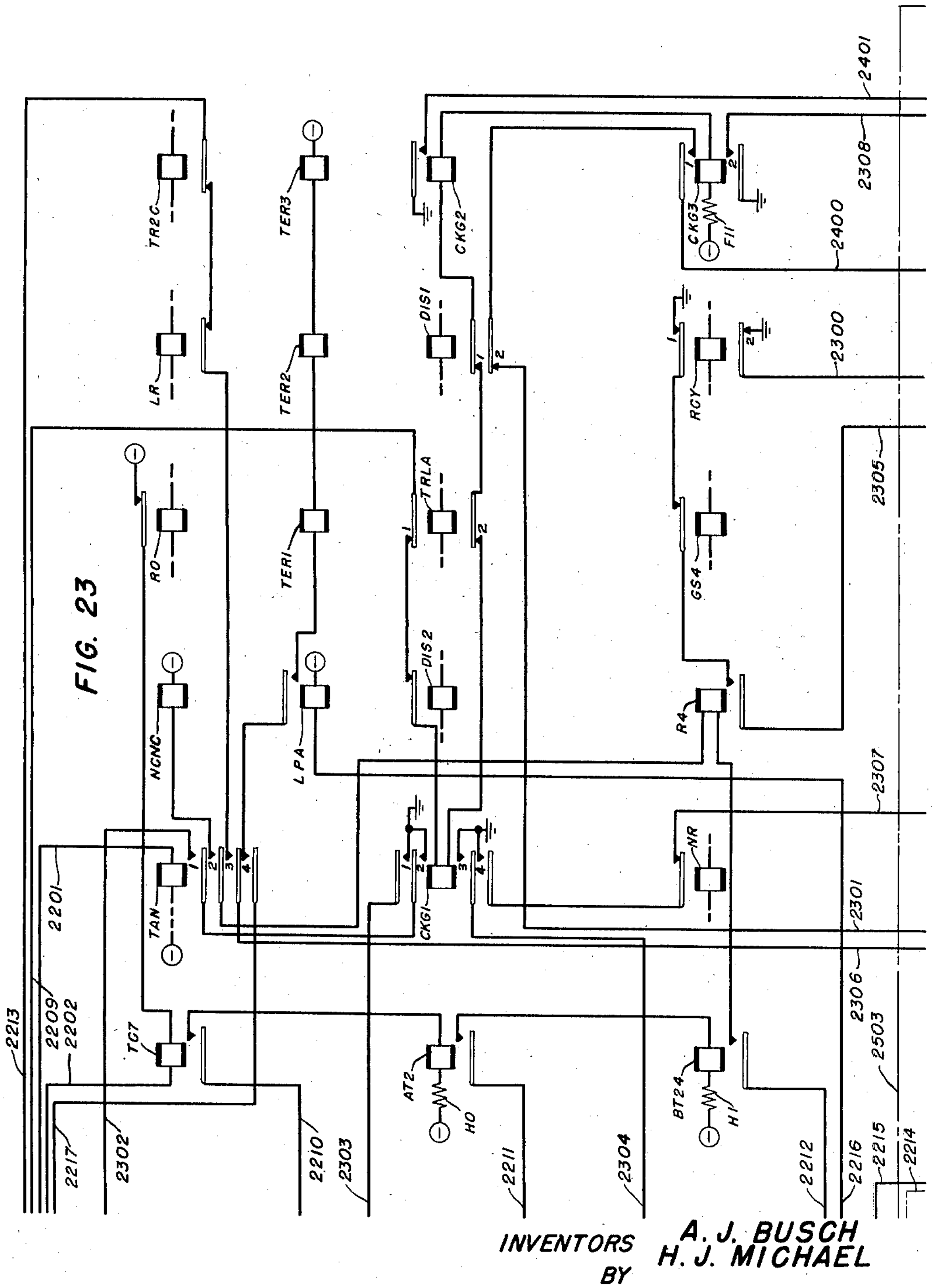
Figure 24:
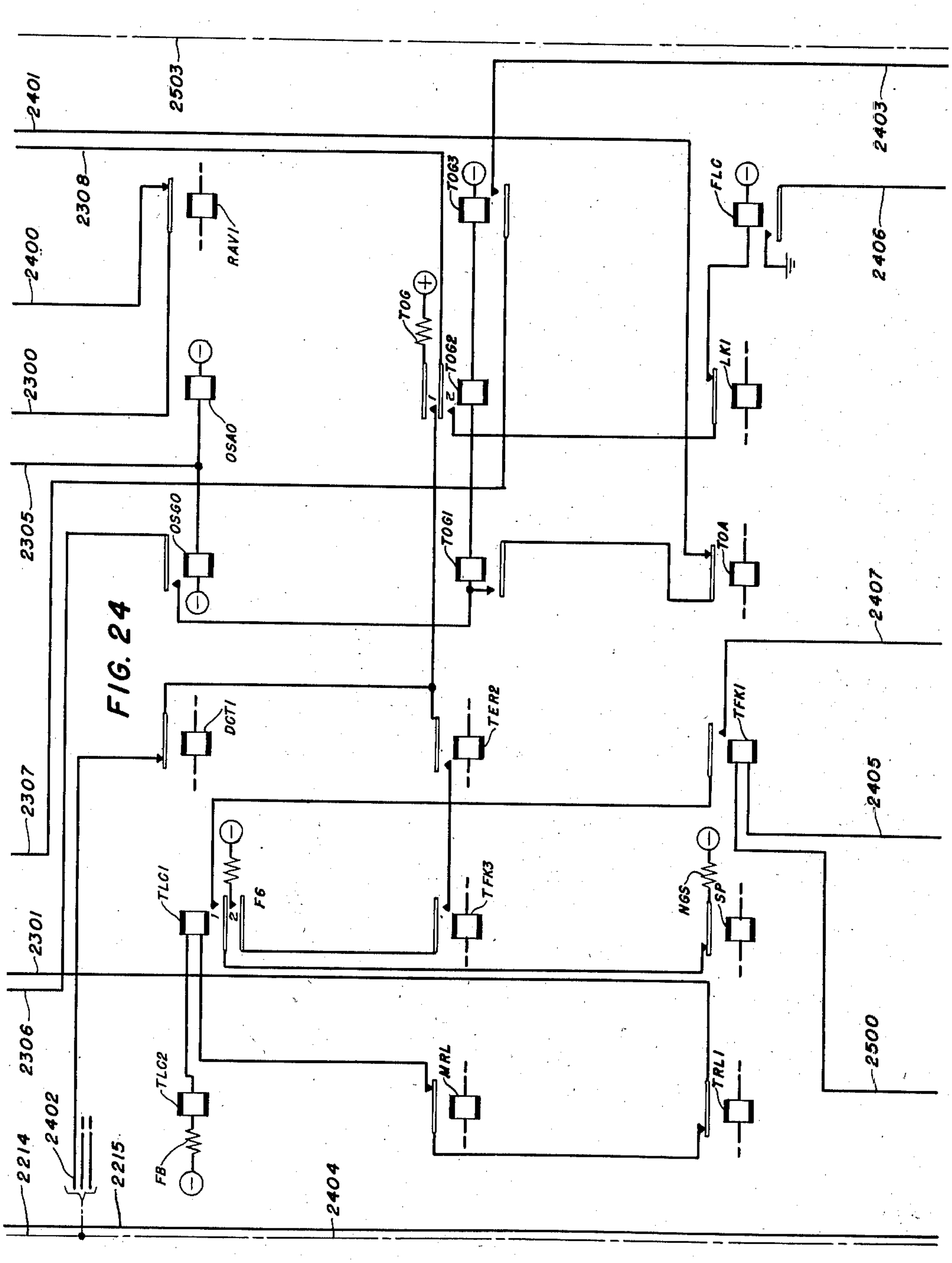
Figure 25:
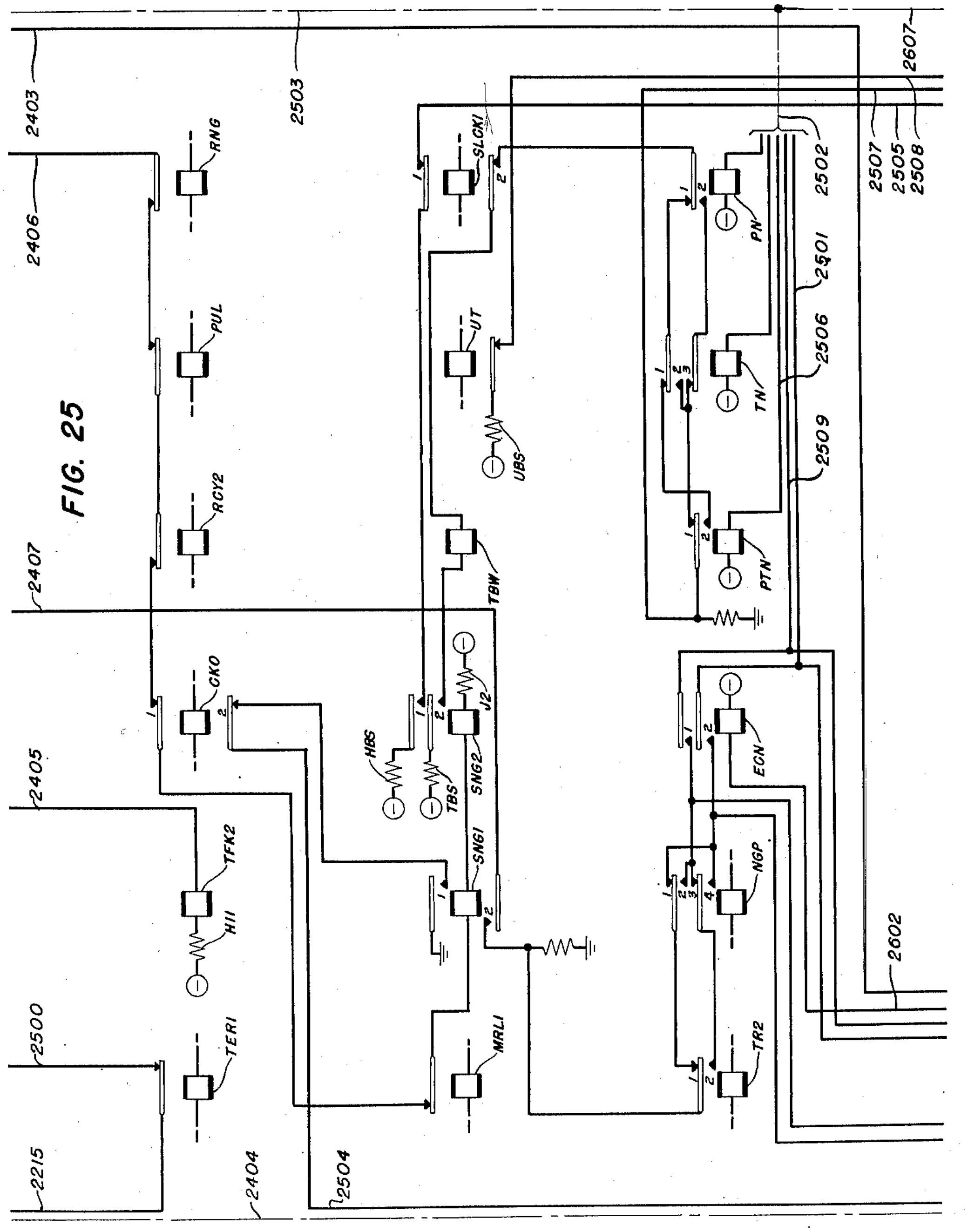
Figure 26:
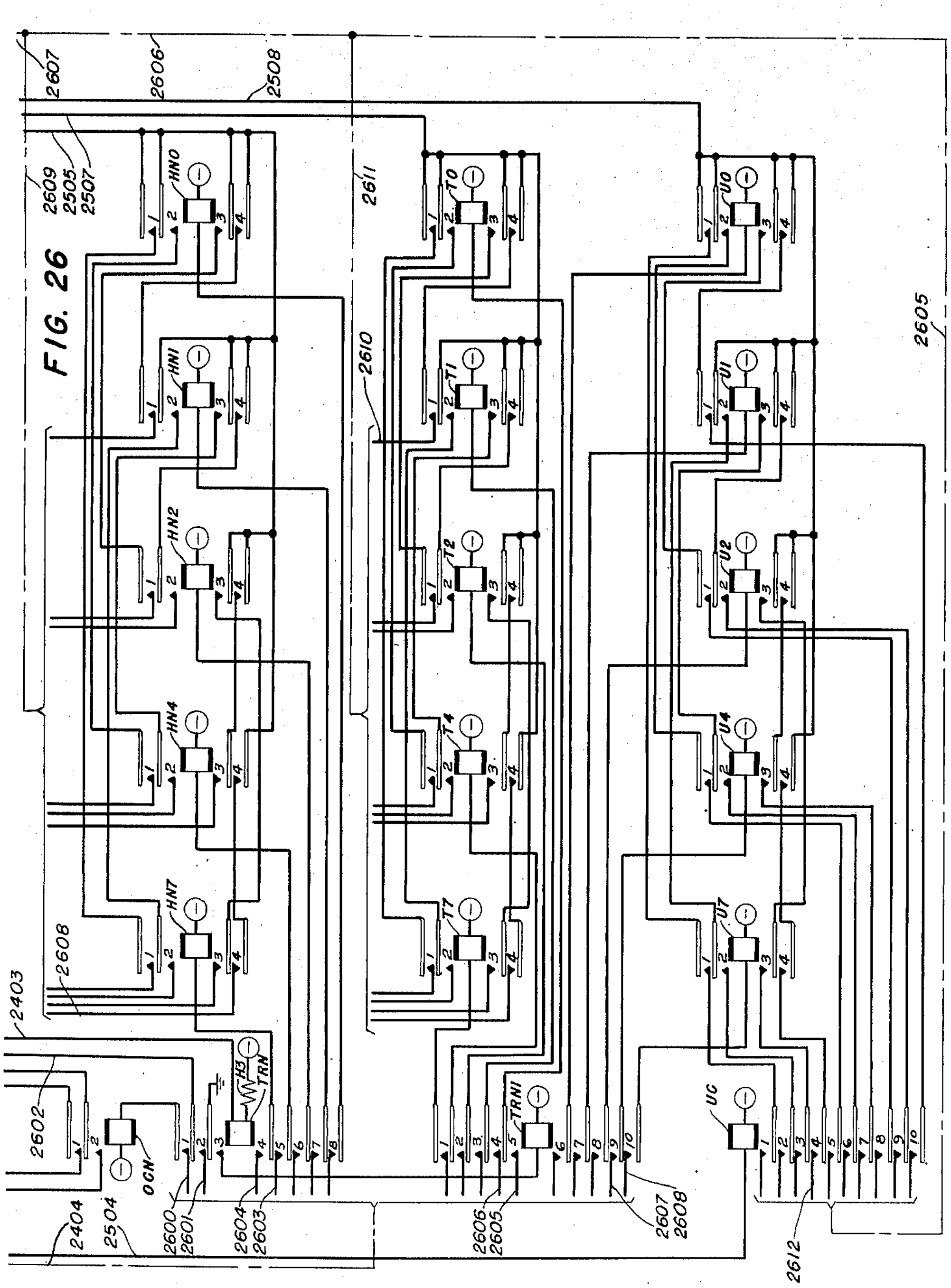
Figure 27:
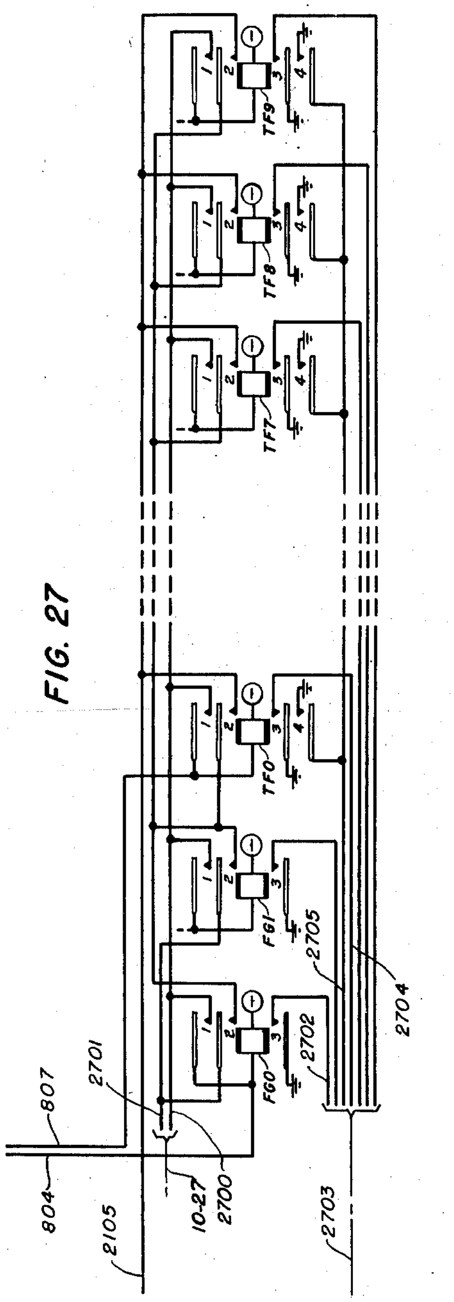
Figure 28:
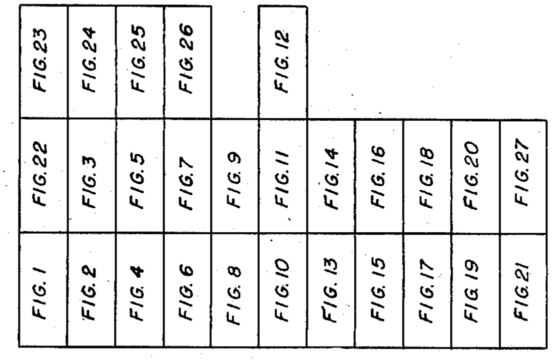
Fig. 28 shows how the separate figures of the drawing may be arranged to form an operative circuit arrangement of an embodiment of the present invention.

The translator circuit of Fig. 18 is arranged to call in a marker after the registration of a number of digits as determined by the "A" digit. When the "A" digit register relays A0(15) and A2(15) operated, circuits were completed for operating the corresponding "A" translator relays TA0(18) and TA2(18). The circuit for relay TA0(18) extends from ground, over contacts 3 and 4 of relay A0(15), conductor 1502, cable 15—18, conductor 1502 to battery through the winding of relay TA0(18). The circuit for relay TA2(18) extends from ground, over contacts 3 and 4 of relay A2(15), conductor 1503, cable 15—18, conductor 1503, to battery through the winding of relay TA2(18). In the meantime, upon the operation of relay P2A(12), a circuit was completed for operating relay TAA(18) extending from battery, through the winding of relay TAA(18), conductor 1800, cross-connection 1701, contact 4 of relay 11B(17), conductor 1702, cable 12—17, conductor 1702, contact 8 of relay P2A(12), conductor 1214, cross-connection 1703, conductor 1704, contact 6 of relay TAN(19), conductor 1903, cross-connection 1705, to ground. Upon the operation of relays TA0(18), TA2(18), and TAA(18), there is but one circuit completed from the terminals AA1 through AA0 in Fig. 18 to the terminals AB1 through AB0. Such circuit is completed from terminal AA2(18), over contact 6 of relay TA0(18), contact 8 of relay TA2(18), contact 9 of relay TAA(18) to terminal AB2(18) corresponding to the "A" digit of 2. If the "A" digit were 9, then relays TAA(18), TA2(18), and TA7(18) would operate thereby providing the only completed circuit extending from terminal AA9(18), over contact 5 of relay TA2(18), contact 6 of relay TA7(18), contact 2 of relay TAA(18) to terminal AB9(18) corresponding to the "A" digit 9.

Upon the operation of steering relays ES(14), FS(14), etc. to LS(14), respective conductors 1401, 1402, 1403, 1404, 1405, 1406, 1407 and 1408 are grounded. Conductor 1401 is grounded when four digits have been registered; conductor 1402 is grounded when five digits have been registered; and so forth, conductor 1404 being grounded after the registration of seven digits and conductor 1407, after ten digits, if required. In the present disclosure seven digits have been registered leaving relays EV(13), GS(14), and HS(14) operated thereby grounding conductors 1403 and 1404, the latter being of sole interest at this time. Ground on conductor 1404, over contact 1 of relay HS(14), is extended through cable 14—18, conductor 1404 to terminal G of Fig. 18.

Two terminals will be observed at the right in Fig. 18, namely, terminals DL(18) and MST(18). Terminal DL(18) extends to conductor 1801, conductor 1802, contact 6 of relay RA1(12), conductor 1215, cable 12—17, conductor 1215, contact 3 of relay DL1(17), contact 1 of relay DT(17), to battery through the winding of relay DL(17). Relay DL(17), if operated, is effective to measure a time delay sufficient to permit the register to register one additional digit, such as a party designation, as will be described hereinafter. Terminal MST(18) extends over conductor 1803 to conductor 1706. Conductor 1706 extends through cable 14—17, conductor 1706, to battery through the winding of the marker start relay MST(11) which, when operated, is effective among other functions, to seize an idle marker circuit.

In Fig. 18 terminal G(18) has been shown cross-connected to both terminals AA2(18) and AA9(18). However, terminal AB2(18) has been shown cross-connected to terminal MST(18), while terminal AB9(18) is cross-connected to terminal DL(18). The significance of such cross-connections is that if the "A" digit is 2 (as has been assumed to be the case where no party identification eighth digit is required) ground on conductor 1404 at the end of registration of the seventh digit will operate relay MST(11) at once. On the other hand, if the "A" digit were 9 (as has been assumed to be the case where a party identification eighth digit may be required) ground on conductor 1404 will start the digit timer DT of Fig. 17 to delay operation of relay MST(11) until sufficient time has elapsed for the additional digit to be registered, if such digit is forthcoming.

Figure 15:
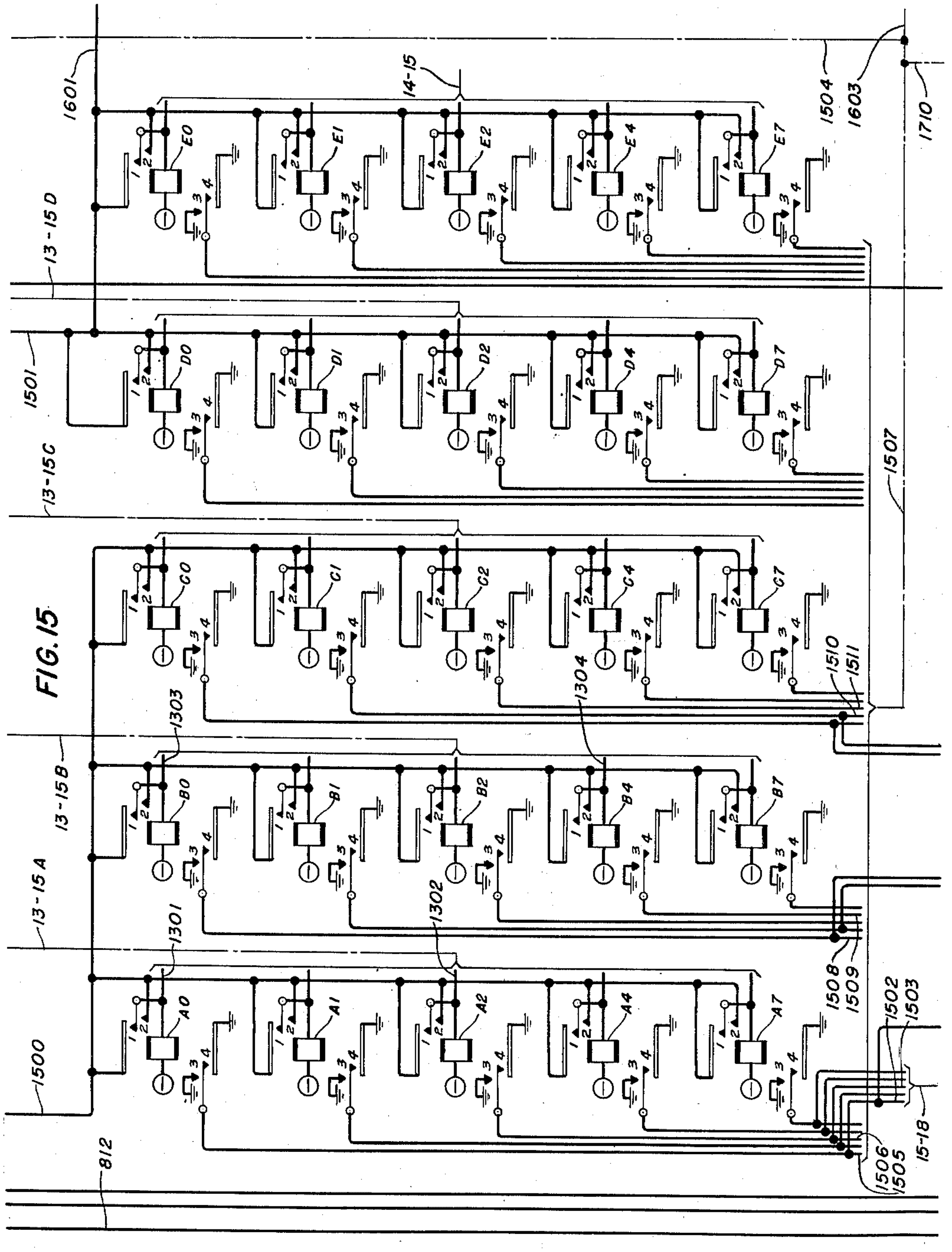

If the "A" digit were 9, according to the assumed fact that the called number might be Whitehall 3-1245-M (digits 943-1245-6), translator relays TA2(18) and TA7(18) would have been operated from the "A" digit register of Fig. 15. Under this condition, when steering relay HS(14) operated at the end of the seventh digit, a circuit would be completed for operating relay DL(17) extending from ground, over contact 1 of relay HS(14), conductor 1404, cable 14—18, conductor 1404, terminal G(18), cross-connection 1804, terminal AA9(18), contact 5 of relay TA2(18), contact 6 of relay TA7(18), contact 2 of relay TAA(18), terminal AB9(18), cross-connection 1805, terminal DL(18), conductor 1801, conductor 1802, contact 6 of relay RA1(12), conductor 1215, cable 12—17, conductor 1215, contact 3 of relay DL1(17), contact 1 of relay DT(17), to battery through the winding of relay DL(17). Relay DL(17), upon operating, opens at its contact 1 an obvious circuit whereby condenser DT(17) was shunted by resistance DT2(17) such that condenser DT(17) has no initial charge thereon. Relay DL(17) completes a charging circuit for condenser DT(17) extending from battery, through resistance DT(17), contact 2 of relay DL(17), resistance DT3(17), resistance DT2(17), condenser DT(17), conductor 1707, cable 14—17, conductor 1707, to ground over contact 11 of relay ON1(11). Relay DL1(17) cannot operate due to a ground shunt on the left side of its winding over contact 3 of relay DL(17), conductor 1708, contact 4 of relay SA1(19), conductor 1904, conductor 1905, conductor 1801, to previously traced ground on terminal DL(18). There will be a time delay before condenser DT(17) acquires sufficient charge to fire tube DT(17) and such time delay is sufficient to permit the registration of an eighth digit if such is forthcoming. If tube DT(17) fires, due to the failure of the trunk circuit to count pulses of an extra digit, it operates relay DT(17) in a circuit extending from off-normal ground on conductor 1707, winding of relay DT(17), tube DT(17), contact 2 of relay DL1(17), contact 2 of relay DL(17), to battery through resistance DT(17). Relay DT(17), upon operating, locks over its contact 2, resistance DT4(17), to battery through resistance DT(17). Relay DT(17) releases relay DL(17) which thereupon reapplies the shunt across condenser DT(17) to eventually extinguish tube DT(17). Relay DT(17) applies, over its contact 3, ground to conductor 1706 previously traced to battery through the winding of relay MST(11) to operate relay MST(11). If the additional digit is received by the trunk circuit, such will be evidenced by the release of relay RA1(12). Relay RA1(12), upon releasing, opens at its contact 6 the operating circuit for relay DL(17) over the contact 3 of relay DL1(17). Relay DL(17) remains operated in series with relay DL1(17), which operates due to removal of the ground from its contact 3. Relay DL1(17), at its contact 2, stops the charging of condenser DT(17) and, at its contact 1, shunts condenser DT(17) with resistance DT2(17). At its contact 4, relay DL1(17) prepares the circuit for operating relay MST(11) over conductor 1706 when relay RA1(12) reoperates at the end of the extra digit.

Under the assumed case, the "A" digit is 2 and no additional digit is required. Under this circumstance relays TA0(18) and TA2(18) were operated from the "A" digit register of Fig. 15. Upon the operation of steering relay HS(14) at the time when seven digits have been registered, conductor 1404 is grounded over contact 1 of relay HS(14). This ground is extended over conductor 1404, cable 14—18, conductor 1404, terminal G(18), cross-connection 1806, contact 6 of relay TA0(18), contact 8 of relay TA2(18), contact 9 of relay TAA(18), terminal AB2(18), cross-connection 1807, terminal MST(18), conductor 1803, conductor 1706, cable 14—17, conductor 1706, to battery through the winding of relay MST(11).

*Establishing transmission condition in trunk*

Figure 12:
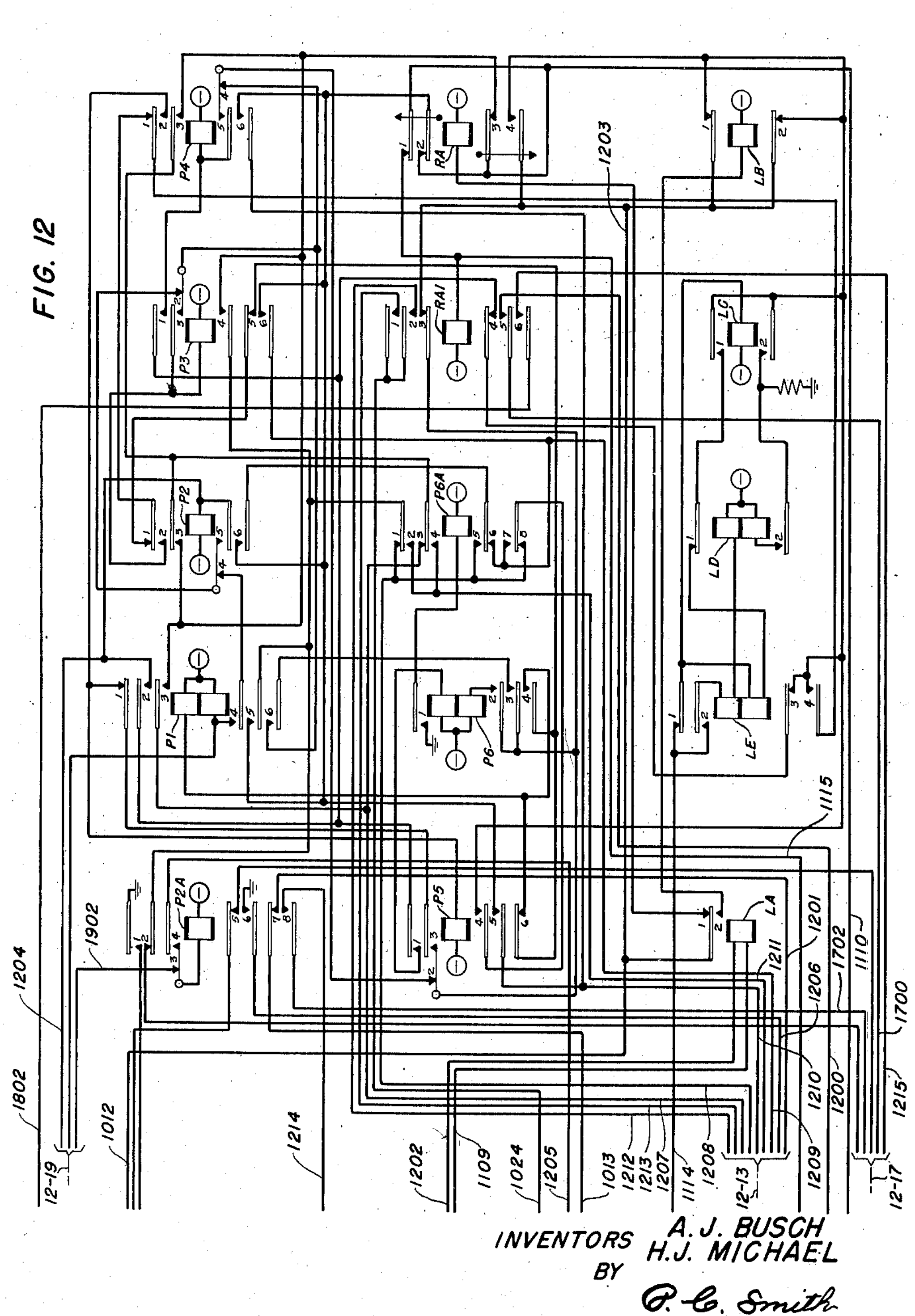
Figure 13:
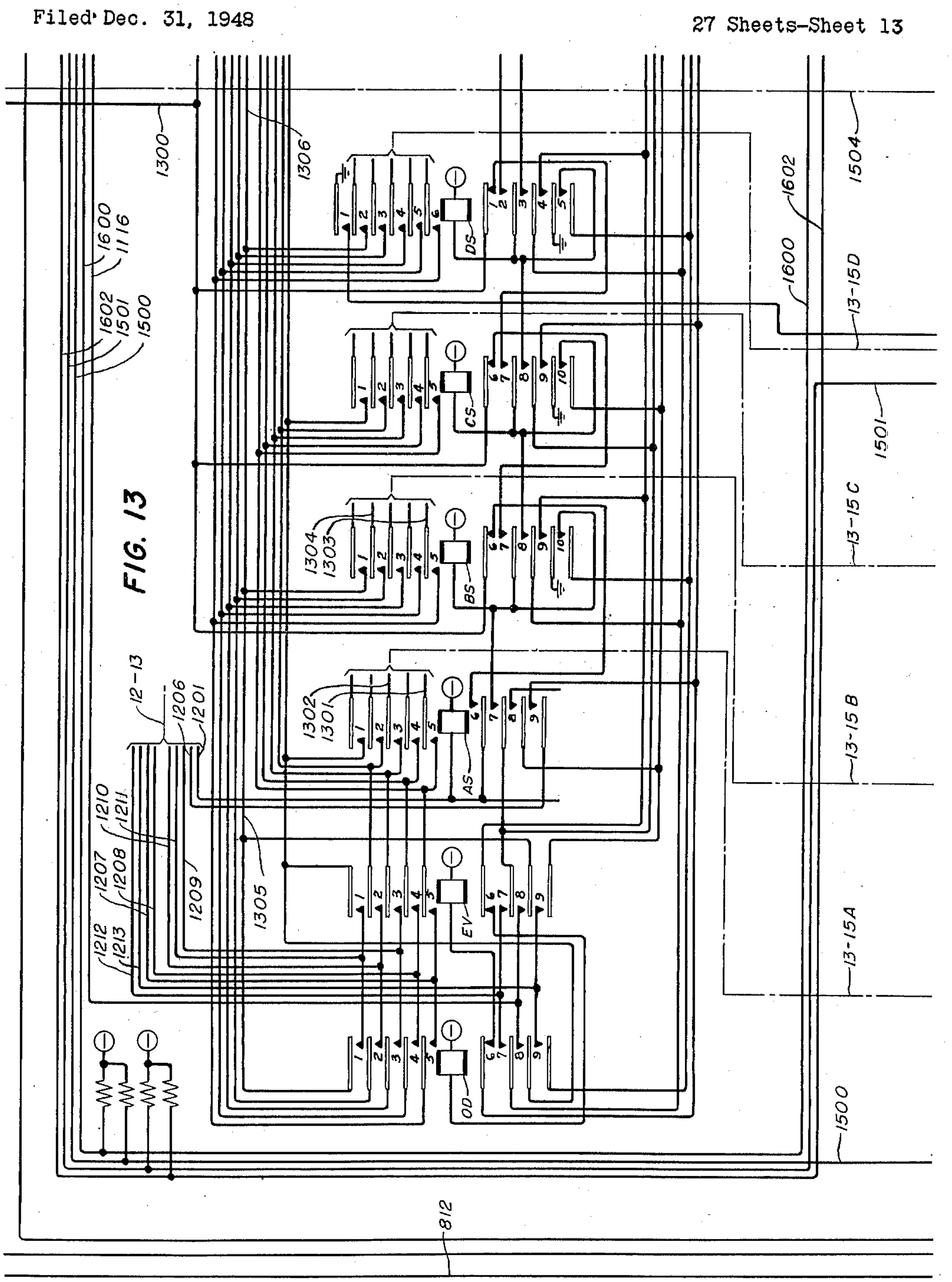
Figure 14:
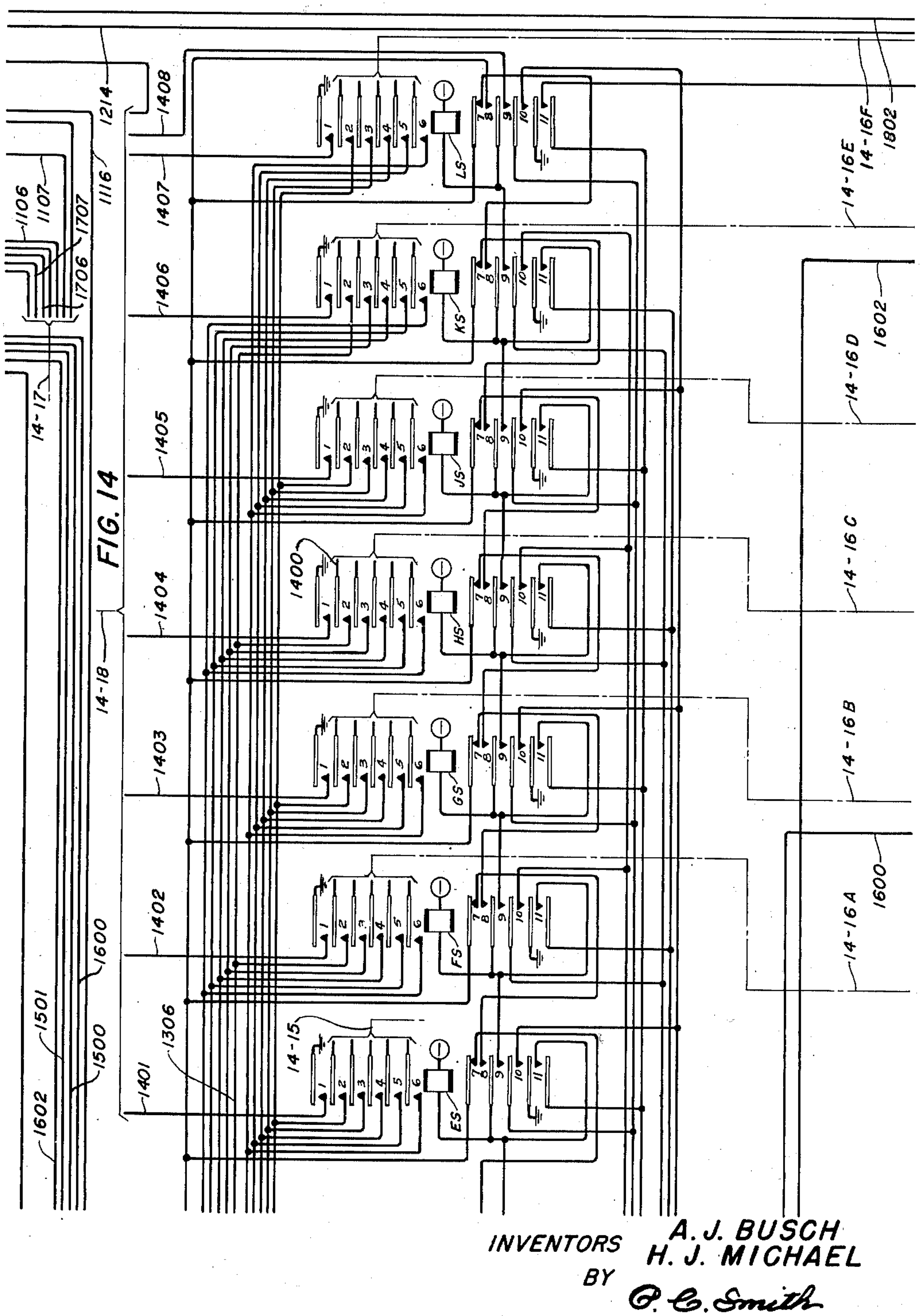

Relay MST(11), upon operating, opens at its contact 4 the pulsing path from contact 1 of relay L(11) to the pulse counting circuit in Fig. 12, thereby preventing the registration of any further pulses. Relay MST(11) closes a circuit for holding relay RA1(12) operated, thereby preventing any further advance of the register circuit. This holding circuit extends from ground, over contact 9 of relay ON1(11), contact 8 of relay MST(11), conductor 1115, to battery through the winding of relay RA1(12). Relay MST(11) operates register relay H7(16) in a circuit extending from ground, over contact 7 of relay ON1(11), contact 5 of relay MST(11), conductor 1116, contact 8 of relay EV(13), conductor 1305, conductor 1306, contact 2 of relay HS(14), conductor 1400, cable 14—16C, conductor 1400, to battery through the winding of relay H7(16). Relay H7(16) operates and locks over its contacts 1 and 2, conductor 1600, to ground over contact 4 of relay ON1(11). (The operation of relay H7(16) is used by the marker under certain trouble conditions as an indication of the last successfully registered digit in the incoming register circuit.) Relay MST(11) opens, at its contact 6, the locking circuit for relay DP(10), releasing that relay, which opens the pulsing path to the trunk circuit.

Relay MST(11), upon operating, completes a circuit for operating relay D(5) of the trunk circuit. Such circuit extends from ground, over contact 2 of relay MST(11), contact 6 of relay TC2(11), lower winding of relay TC1(11), conductor 1117, contact 11 of relay ON(10), conductor 1025, cable 810, conductor 1025, contact 1 of the link switch, conductor 818, cable 5—8B, conductor 818, to battery through the winding of relay D(5). Relay D(5) operates in the circuit and locks over its own contact 7, to ground over contact 3 of relay IN(5), the latter relay IN(5) remaining locked under control of contact 4 of relay E(5). Relay TC1(11) does not operate because its upper winding is energized so as to oppose that due to the lower winding. Relay D(5), upon operating, releases relay C0(5) and places the signaling lead 502 under the control of relays LT(5) and SV(7). The latter circuit extends from conductor 502, contact 1 of jack B(5), conductor 700, contact 1 of relay BY(7), conductor 501, contact 6 of relay D(5), contact 8 of relay LT(5), conductor 506, to ground over contact 1 of relay SV(7).

The locking ground for relay D(5) from contact 3 of relay IN(5), above described, is returned to the register over the operating path for relay D(5), above described, over conductor 1117 to the left side of the windings of relay TC1(11). Since the lower winding of relay TC1(11) is shunted, relay TC1(11) operates by virtue of the upper winding. Relay TC1(11) operates relay TC2(11) in an obvious circuit from ground over contact 2 of relay TC1(11). Relay TC2(11) locks over two circuits: one circuit through its lower winding, over its contacts 5, to ground over contact 2 of relay MST(11); and, the other circuit through its upper winding, over its contact 4, conductor 1118, to ground over contact 4 of relay H(10).

*Selection and seizure of an idle marker*

Relay TC2(11), upon operating, energizes a start lead to an incoming register marker connector, such as 100 of Fig. 1, for the selection of an idle marker circuit. Such start signal may be traced from battery, over contact 2 of relay TC2(11), contact 3 of relay MRL(11), contact 3 of relay TRL(11), conductor 1119, cable 1120, and cable 101 to the connector circuit 100.

The details of the connector circuits shown in Fig. 1 and of number group circuits, senders and sender links, together with details of the channels connecting line-link frames with trunk-link frames, etc. are disclosed herein by reference only. The aforementioned Busch and Adam-Avery disclosures can, by reference thereto, supply such details, including the marker circuits, as are not specifically dealt with herein. Furthermore, only such marker details as are necessary for the understanding of a tandem-through-connection are shown in the drawings.

The incoming register marker connector 100 effects interconnection between the incoming register of Figs. 10 through 21 and 27 and the marker, skeletonized in Figs. 22 through 26, over the additional cable 102. The incoming register operates the following relays, among others (not shown), in the marker: class relay TAN (23) to indicate to the marker the type of connection desired; translator control relay TC7(23) to indicate to the marker the number of digits in the called directory number, seven in this case; two-out-of-five "A" digit registers AC0, 1, 2, 4, 7(22) to register the first digit of the called office code; two-out-of-five "B" digit registers BC0, 1, 2, 4, 7(22) to register the second office code digit; two-out-of-five "C" digit registers CC0, 1, 2, 4, 7(22) to register the third office code digit; and, the check relays for the connector circuit CKG1(23), CKG2(23), and CKG3(23) to provide grounds and circuits for marker functions.

Relay TAN(23) operates in a circuit extending from ground, over contact 7 of relay R0(17), conductor 1709, cable 17—21, conductor 1709, conductor 2106, conductor 2107, conductor 2108, conductor 2109, contact 3 of relay TAN(19), conductor 1906, cables 1907, 1908, 1710, 1504 and 101, connector 100, cable 102, cable 2200, conductor 2201, to cross-detector battery through the winding of relay TAN(23).

Relay TC7(23) operates in a circuit extending from ground, over contact 5 of relay R0(17), conductor 1711, cable 17—21, conductor 1711, conductors 2110, 2111, 2112, 2113, contact 4 of relay TAN(19), conductor 1909, contact 1 of relay 11B(17), conductor 1712, cables 1710, 1504 and 101, connector 100, cable 102, cable 2200, conductor 2202, winding of relay TC7(23), the contact of relay R0(23), to cross-detector battery.

The "A" digit register relays AC0(22) and AC2(22) are operated in respective circuits from grounds, over contacts 3 and 4 of each of relays A0(15) and A2(15), conductors 1505 and 1506, cables 1507, 1504 and 101, connector 100, cable 102, cable 2200, conductors 2203 and 2204, to batteries through the windings of relays AC0(22) and AC2(22).

The "B" digit register relays BC0(22) and BC4(22) are operated in respective circuits from grounds, over contacts 3 and 4 of each of relays B0(15) and B4(15), conductors 1508 and 1509, cables 1507, 1504 and 101, connector 100, cable 102, cable 2200, conductors 2205 and 2206, to batteries through the windings of relays BC0(22) and BC4(22).

The "C" digit register relays CC1(22) and CC2(22) are operated in respective circuits extending from grounds, over contacts 3 and 4 of each of relays C1(15) and C2(15), conductors 1510 and 1511, cables 1507, 1504 and 101, connector 100, cable 102, cable 2200, conductors 2207 and 2208, to batteries through the windings of relays CC1(22) and CC2(22).

The connector check relays CKG1(23), CKG2(23) and CKG3(23) operate in a circuit extending from ground in the connector circuit 100, through cable 102, cable 2200, conductor 2209, contact 1 of relay TRLA(23), the contact of relay DIS2(23), winding of relay CKG1(23), contact 2 of relay TRLA(23), contact 1 of relay DIS1(23), winding of relay CKG2(23), winding of relay CKG3(23) to battery through resistance F11(23). Relay CKG3(23) operates relay TLC1(24) and TLC2(24) in a circuit extending from ground, over contact 2 of relay RCY(23), conductor 2300, the contact of relay RAV1(24), conductor 2400, contact 1 of relay CKG3(23), contact 2 of relay DIS1(23), conductor 2301, contact of relay TRL1(24), the contact of relay MRL(24), winding of relay TLC1(24), winding of relay TLC2(24), to battery through resistance FB(24).

The registration in the above office code digit registers of the "A," "B," and "C" digits of the office code may be used as a means of operating a route relay R4(23) and a route series relay NCNC(23) in the marker to furnish the marker with information necessary for establishing the required connection. The "A" digit translator relay AT2(23), one of ten such relays, operates in a circuit extending from ground, over contact 2 of relay CKG1(23), contact 1 of relay TAN(23), conductor 2302, contact 2 of relay AC0(22), contact 4 of relay AC2(22), conductor 2210, contact of relay TC7(23), winding of relay AT2(23), to battery through resistance H0(23). Relay AT2(23), upon operating, extends ten leads from the "B" digit register relays BC0, 1, 2, 4, 7(22) to the windings of ten "B" digit translator relays, one of which has been shown as relay BT24(23). Relay BT24(23) operates in a circuit extending from ground, over contact 1 of relay CKG1(23), conductor 2303, contact 3 of relay BC0(22), contact 4 of relay BC4(22), conductor 2211, contact of relay AT2(23), winding of relay BT24(23), to battery through resistance H1(23). Relay BT24(23), upon operating, extends ten leads from the "C" digit register relays CC0, 1, 2, 4, 7(22) to the operating circuits for route and route series relays, such as R4(23) and NCNC(23). Relays R4(23) and NCNC(23) operate in a circuit extending from ground, over contact 3 of relay CKG1(23), conductor 2304, contact 1 of relay CC1(22), contact 3 of relay CC2(22), conductor 2212, contact of relay BT24(23), winding of relay R4(23), contact 2 of relay TAN(23), winding of relay NCNC(23), to battery.

Figure 2:
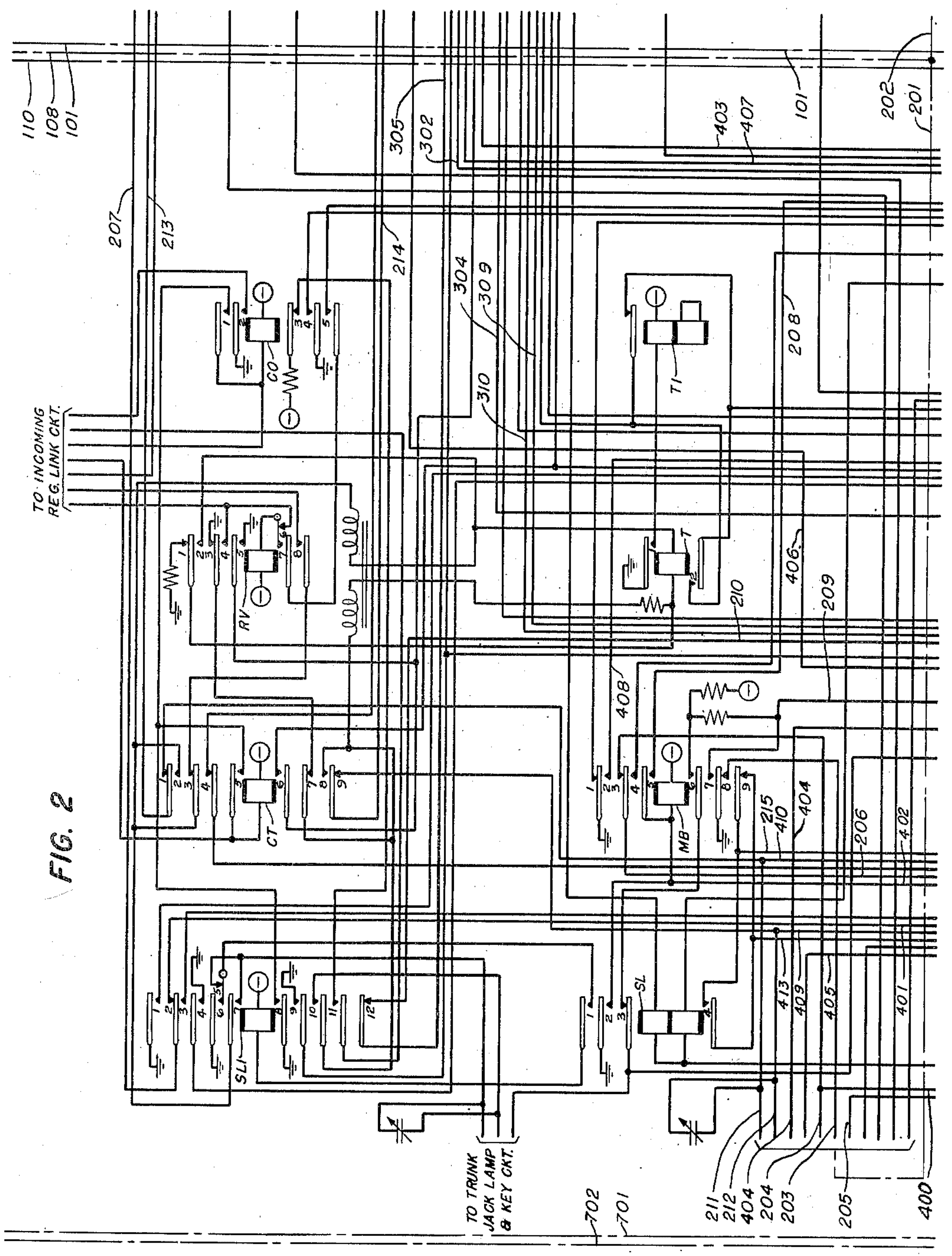
Figure 3:
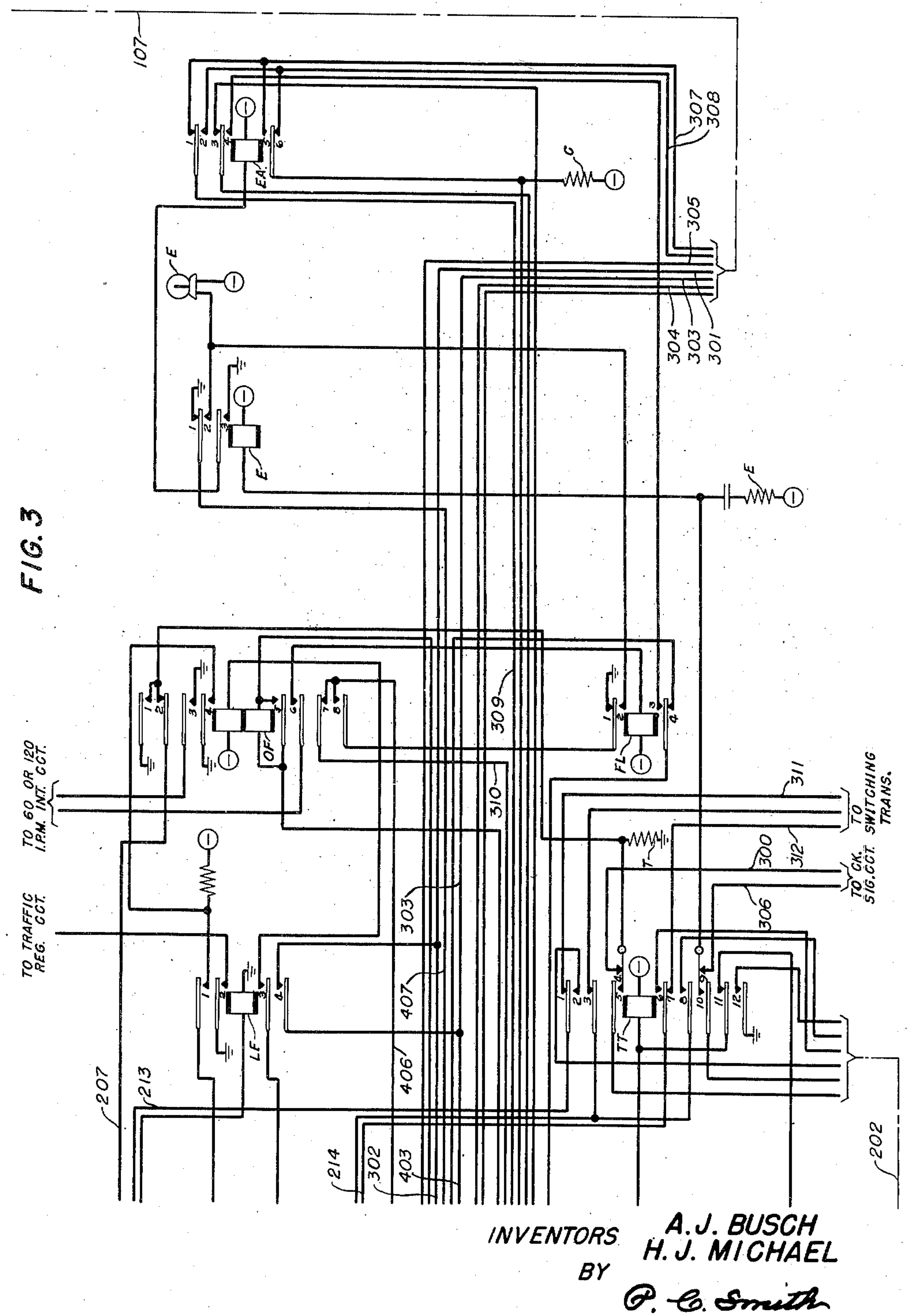
Figure 4:
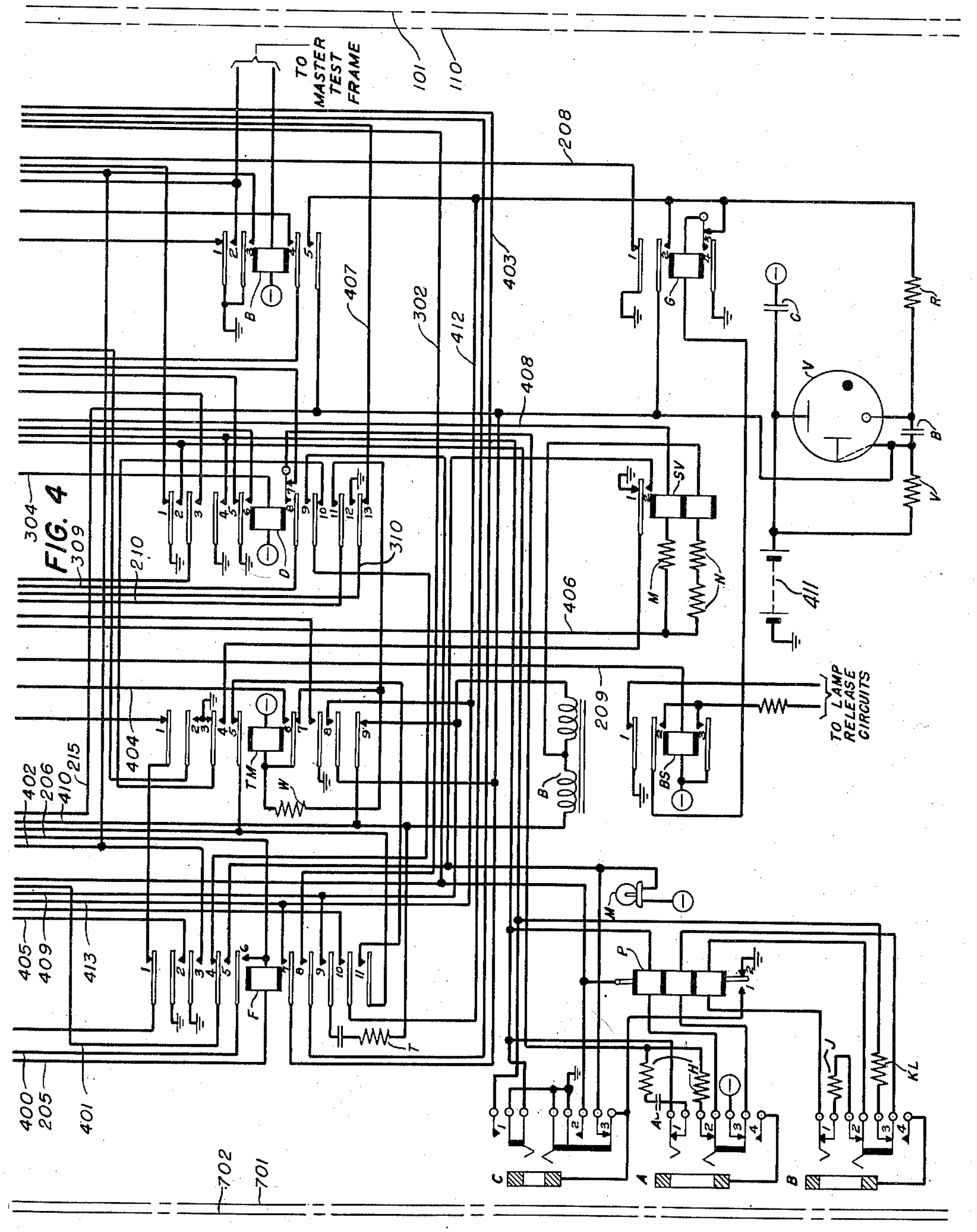

The operation of the route relay R4(23) informs the marker, as in the Busch and Adam-Avery disclosures, of some of the necessary information required by the marker in properly controlling the indicated connection, including the location on the trunk-link frames of a proper outgoing trunk circuit, such as disclosed in Figs. 2, 3 and 4, and including the requirement of obtaining the services of an outgoing sender of the proper type (dial pulse in this case). Relay R4(23), upon operating, operates an outgoing sender group relay OSG0(24) and its auxiliary relay OSA0(24) in a circuit extending from ground, over contact 1 of relay RCY(23), contact of the ground supply relay GS4(23), contact of relay R4(23), conductor 2305 to batteries in parallel through the windings of relays OSG0(24) and OSA0(24).

The operation of the tandem trunk call class relay TAN(23) and of the sender group relay OSG0(24), as above, causes the operation of the tandem outgoing class relays TOG1(24), TOG2(24) and TOG3(24). The circuit for the latter relays extends from ground in the connector circuit 100, through cable 102, cable 2200, conductor 2213, the contact of relay TR2C(23), the contact of relay LR(23), contact 3 of relay TAN(23), conductor 2306, the contact of relay OSG0(24), windings of relays TOG1(24), TOG2(24), and TOG3(24), to battery. Relays TOG1(24), TOG2(24) and TOG3(24) operate and lock over the contact of relay TOG1(24), the contact of relay TOA(24), conductor 2401, to ground over the contact of relay CKG2(23).

*Trunk frame number, directory number and trunk number to marker*

Furthermore, the marker, upon being interconnected with the incoming register, receives the trunk-link frame tens and units digits of the frame upon which the incoming trunk has an appearance, the full directory number, and the arbitrary incoming trunk member.

The trunk-link frame number tens digit 0 is transmitted to the marker from ground, over contact 3 of relay FG0(27), conductor 2702, cables 2703, 2114, 1907, 1908, 1710, 1504, 101, connector 100 and cable 102. The trunk-link frame units digit 0 is transmitted to the marker on a two-out-of-five basis from grounds, over contacts 3 and 4 of relay TF0(27), conductors 2704 and 2705, cables 2703, etc. to the marker over cable 102 from connector 100. The marker operates the positive or lower half of relay F(5) of the incoming trunk circuit in a circuit extending from ground, over contact 3 of relay IN(5), upper winding of relay F(5), lower winding of relay F(5), conductor 507, cable 5—8B, conductor 507, contact 5 of the link switch, conductor 819, cables 1120 and 101, connector 100, cable 102, cable 2214, conductor 2402, the contact of relay DCT1(24), contact 1 of relay TOG2(24), to positive battery through resistance TOG(24). Relay F(5) operates relay TF(7) in a circuit from ground, over contact 4 of relay F(5), conductor 509, to battery through the winding of relay TF(7). The trunk circuit then awaits the completion of marker operations before further switching takes place on a tandem call.

Figure 16:
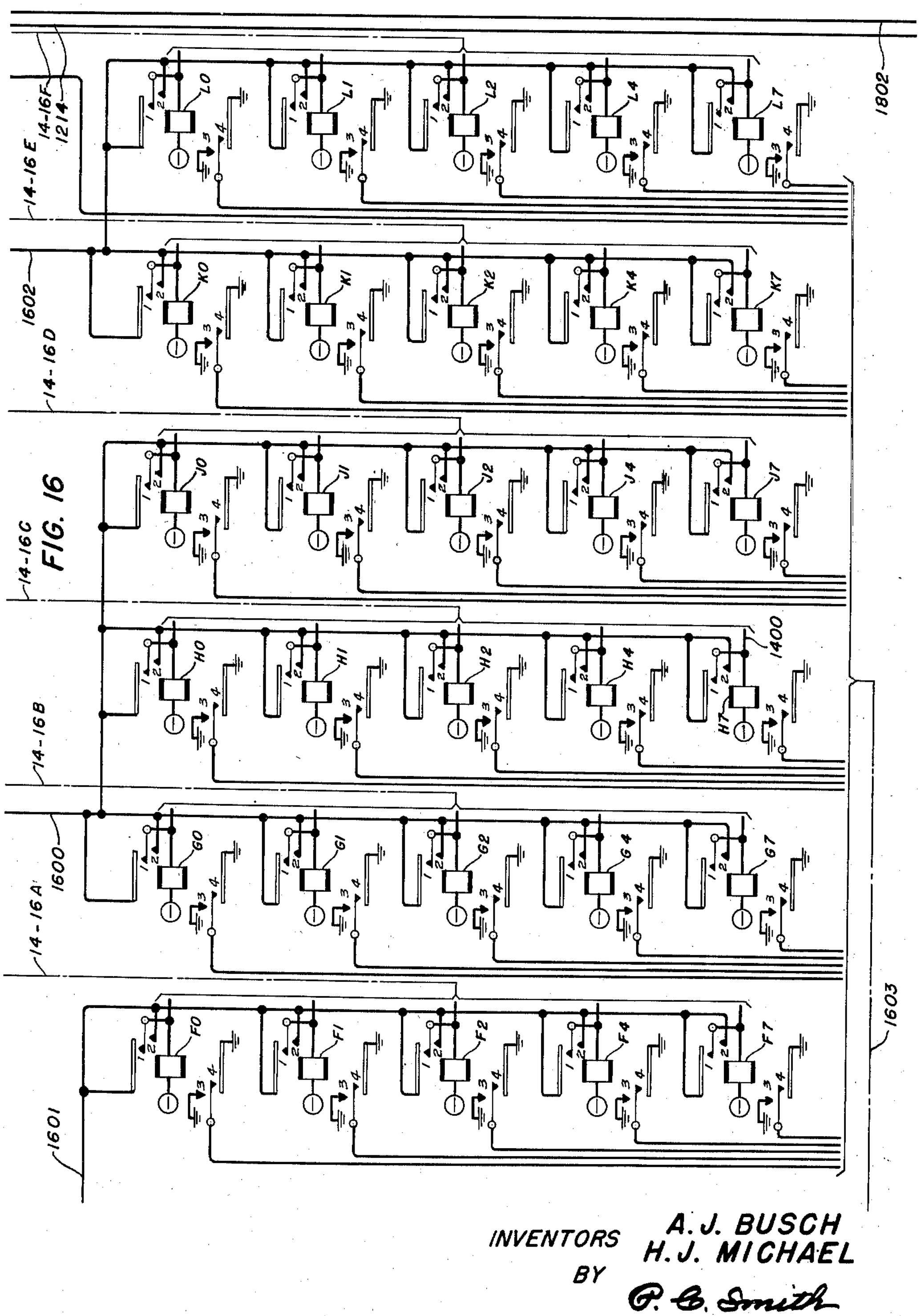
Figure 17:
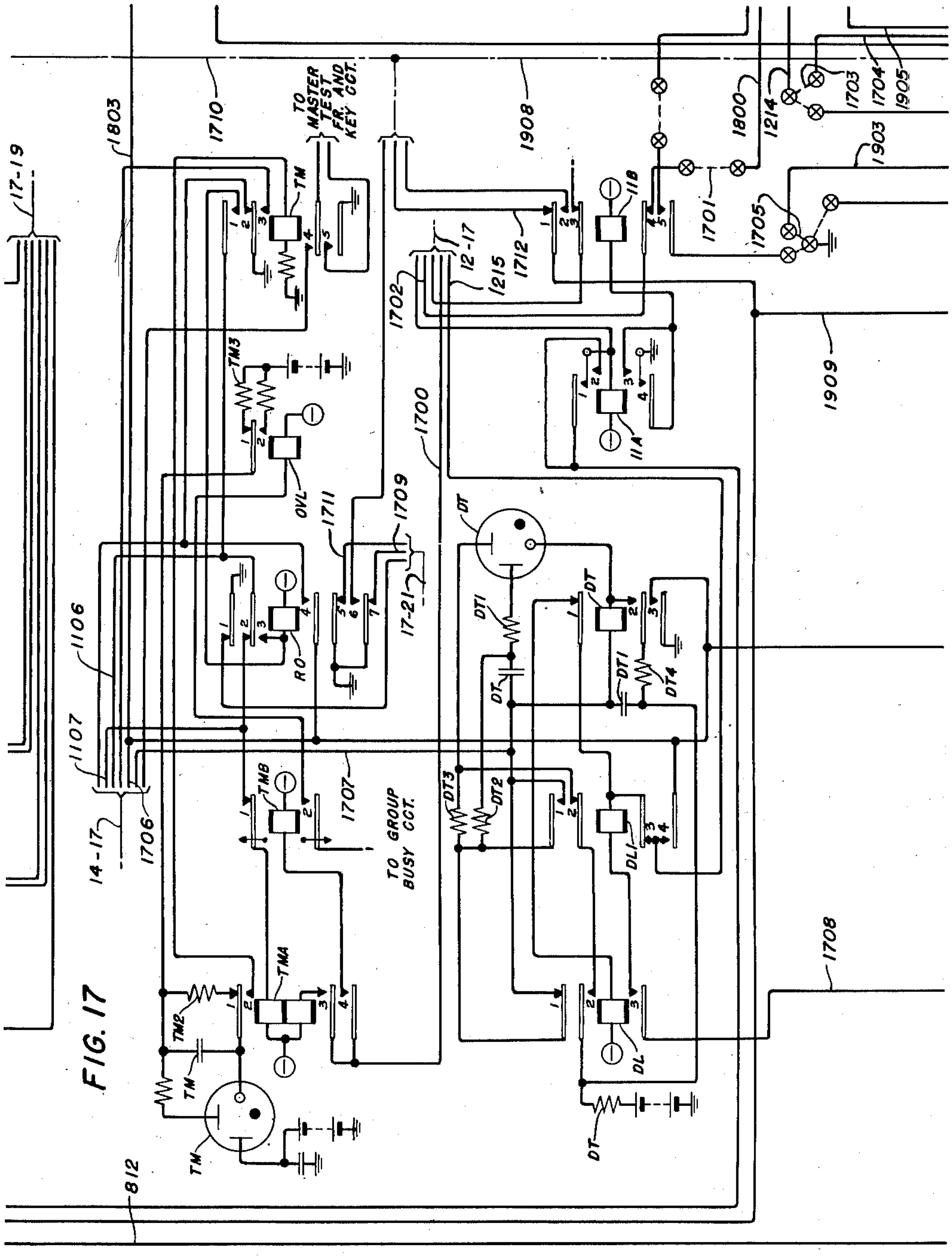

The A, B, C, D and E digits are transmitted through the marker to the sender on a two-out-of-five basis from ground over contacts 3 and 4 of each of the operated register relays of Fig. 15 in an obvious manner over cables 1507, 1504 and 101, connector 100 and cable 102. Likewise the F and G digits are transmitted through the marker on a two-out-of-five basis from ground over contacts 3 and 4 of the operated F and G register relays of Fig. 16 in an obvious manner over cables 1603, 1504 and 101, connector 100 and cable 102. The 7 lead from the H register of Fig. 16 is grounded to the marker over contacts 3 and 4 of register relay H7(16) as previously described as an end of number signal.

*Selection of outgoing trunk and sender*

In response to the operation of the route relay R4(23) and of the route series relay NCNC(23), the marker tests the trunk-link frames for idle outgoing trunks of the desired type, such as shown in Figs. 2, 3 and 4, and proceeds to select an idle such trunk through a trunk-link frame connector circuit 105. The selection and seizure of such an outgoing trunk is similar to the procedure described for such a selection and seizure in Busch, above, for a subscriber outgoing call connection.

In accordance with a procedure similar to that described in Busch, above, the marker, as a result of the operation of relays OSG0(24) and OSA0(24), effects interconnection with an idle dial pulse outgoing sender 103 through a connector 104. The marker transmits the called directory number from the incoming register to the selected sender preparatory to outpulsing and interconnects said trunk with said sender 103 through an outgoing sender link 106.

In regard to the trunk circuit of Figs. 2, 3 and 4, such trunk is connected to the sender link 106 over cable 107, to the trunk-link frame over cables 108, 201 and 202, and to the remote terminating office as indicated by the legends at the bottom of Fig. 3.

In selecting an idle outgoing trunk the marker tests for ground on conductor 203 of each trunk-link frame for all trunks which have access to an idle sender. Ground on conductor 203 from contact 8 of the trunk relays, such as MB(2), indicates that the associated frame has at least one idle such trunk. The marker selects one such frame and connects ground to conductor 204 and low resistance battery to conductor 205 for one such trunk on that frame. Relay F(4) is thereby operated in a circuit extending from ground in the marker, over conductor 204, contact 3 of busy relay MB(2), conductor 206, winding of relay F(4), to low resistance battery in the marker over conductor 205. Relay F(4) locks over its contact 6, conductor 400, to ground in the marker over conductor 204. Prior to the operation of relay F(4), conductor 300 of Fig. 3, which extends to the signal circuit to the terminating office, was grounded as a so-called "on-hook" or idle condition. This ground extended over contact 3 of relay TM(4), contact 10 of relay D(4), contact 4 of relay F(4), conductor 401, contact 2 of relay SL1(2), conductor 207, contact 2 of relay OF(3), contact 4 of relay TT(3), conductor 300 to the signal circuit. The operation of relay F(4) transfers this circuit for conductor 300 from its contact 4 to its contact 5, which contact 5 may be traced to battery through resistance lamp M(4). This change from ground to battery on conductor 300 is recognized as a seizure signal at the terminating office.

Relay F(4), upon operating, operates the busy relay MB(2) in a circuit extending from ground, over contact 3 of relay F(4), conductor 402, to battery through the winding of relay MB(2). Relay MB(2) locks over its contact 5, conductor 208, to ground over contact 1 of relay G(4). Relay MB(2), at its contact 8, removes ground from conductor 203 to indicate to other markers a busy condition. Relay MB(2) operates relay BS(4) from ground, over contact 7 of relay MB(2), conductor 209, to battery through the winding of relay BS(4).

When the marker operates the select magnet of the sender link 106 associated with the selected sender 103, ground is connected to conductor 301 in Fig. 3 from the link 106, and over conductor 302, contact 8 of relay F(4), conductor 403, conductor 303, to the link circuit 106 over cable 107 to operate the hold magnet in the link 106 associated with the selected outgoing trunk to interconnect the selected sender 103 with the outgoing trunk. This hold magnet (not shown) locks under control of the sender. The sender returns ground over conductor 304 of Fig. 3, to battery through the winding of relay D(4), which operates. Relay D(4), upon operating, energizes the middle bias winding of relay P(4) in a circuit extending from battery, over contact 3 of jack A(4), middle winding of relay P(4), contact 3 of jack B(4), resistance KL(4), to ground over contact 2 of relay D(4). The middle bias winding of relay P(4) tends to hold the armature thereof on contact 2 of relay P(4).

Relay D(4) operates relay TM(4) from ground on conductor 305 of Fig. 3, contact 12 of relay SL1(2), conductor 210, contact 11 of relay D(4), contact 7 of relay TM(4), to battery through the winding of relay TM(4).

As a result of the seizure signal sent to the terminating office over conductor 300, it is probable that ground would be returned over conductor 306 as a signal to delay pulsing until certain equipment is ready to receive pulsing. This ground on conductor 306 extends over contact 9 of relay TT(3) to battery through the winding of relay E(3). Relay E(3) operates, thereby operating relay EA(3) in an obvious circuit over contact 3 of relay E(3). The sender tests the tip and ring conductors 307 and 308. On the tip conductor 307 the sender detects battery over contact 5 of relay EA(3) and through resistance C(3). The sender detects ground on the ring conductor 308, over contact 2 of relay EA(3), conductor 309, contact 8 of relay D(4), resistance H(4), contact 2 of jack A(4), upper winding of relay P(4), to ground over contact 4 of relay D(4). The sender 103 recognizes battery on the tip and ground on the ring as a "delay dial" signal and will not outpulse until the situation is reversed.

*Interconnecting the incoming and outgoing trunks*

After the marker has seized an idle outgoing trunk with an associated sender, it proceeds to interconnect the two trunks. Incoming toll or tandem trunks have line-link frame appearances just like those of subscribers. In this disclosure the incoming trunk has been shown with two line-link frame appearances designated by cables 702 and 701 extending from the tip, ring and sleeve conductors of the incoming trunk, in Fig. 7, to the appearances 111 and 112 respectively on two different ones of the line-link frames of Fig. 1. The use of line-link frame appearances for toll and tandem incoming trunks makes it possible for the marker to perform the necessary interconnection in a manner similar to the subscriber outgoing type of connection above referred to in the Busch disclosure. Once the marker has determined the line-link appearance of the trunk, and has selected and seized same, the operations from that time to completion of the interconnection follow the subscriber outgoing call type of interconnection.

In order for the marker to select a line-link appearance of the incoming trunk, it must consult a number group circuit for a translation of the arbitrary trunk number of the incoming trunk into location information of the line-link frame appearance of said trunk. Such information will be furnished by a number group circuit in the form of frame tens and units, horizontal and vertical groups, and vertical file, similarly to such location information furnished to markers desiring translation of a called directory number.

Upon the operation of relays TOG3(24) and CKG1(23), above described, relay TRN(26) operates in a circuit extending from ground, over contact 4 of relay CKG1(23), the contact of relay NR(23), conductor 2307, the contact of relay TOG3(24), conductor 2403, winding of relay TRN(26), to battery through resistance H3(26). Relay TRN(26) operates relay TRN1(26) in an obvious circuit over contact 3 of relay TRN(26). Upon the operation of relay TRN(26), one of two circuits is completed from ground in the marker connector 100, through cable 102, cable 2214, cable 2404, over one of the two conductors 2600 and 2601 (the choice of connection is made by cross-connection in the connector circuit). It will be assumed that conductor 2601 is thereby grounded. It extends over contact 2 of relay TRN(26), conductor 2602, to battery through the winding of relay ECN(25) to operate that relay.

With relays TRN(26) and TRN1(26) operated, the incoming register effects the registration in the marker of the hundreds, tens and units digits of the arbitrary trunk number, 010 as assumed. The hundreds digit register relays HN4(26) and HN7(26) of the marker are operated in circuits extending from ground, over contacts 1 and 2 of relay LT0(20), terminals HA0(20) and HB0(20), cross-connections 2002 and 2003, terminals HT4(20) and HT7(20), conductors 2004 and 2005, cables 2006, 1908, 1710, 1504, 101, connector 100, cable 102, cable 2214, cable 2404, conductors 2603 and 2604, contacts 5 and 4 of relay TRN(26), to battery through the windings of relays HN4(26) and HN7(26). The tens digit register relay T0(26) and T1(26) of the marker are operated in circuits extending from ground, over contacts 6 and 5 of relay LT0(20), terminals TA0(20) and TB0(20), cross-connections 2007 and 2008, terminals TT0(20) and TT1(20), conductors 2009 and 2010, cables 2011, 1907, 1908, 1710, 1504, 101, connector 100, cable 102, cable 2214, cable 2404, conductors 2605 and 2606, contacts 5 and 4 of relay TRN1(26), to battery through the windings of relays T0(26) and T1(26). The units digit register relays U4(26) and U7(26) of the marker are operated in circuits extending from ground, over contacts 3 and 4 of relay LU0(20), conductors 2012 and 2013, cables 2014, 1907, 1908, 1710, 1504, 101, connector 100, cable 102, cable 2214, cable 2404, conductors 2607 and 2608, contacts 9 and 10 of relay TRN1(26), to battery through the windings of relays U4(26) and U7(26).

Furthermore, when the marker has seized the trunk-link frame terminating the selected outgoing trunk, a check ground from the trunk-link connector 105, is returned to the marker to operate relays TFK1(24) and TFK2(25). This circuit extends from ground in the connector 105, over cable 113, conductor 2215, the contact of relay TER1(25), conductor 2500, winding of relays TFK1 (24), conductor 2405, and TFK2(25), to battery through resistance H11(25).

Also, upon the above operation of relays CKG3(23) and TOG2(24), a circuit is completed for operating relay FLG(24) from ground, over contact 2 of relay CKG3(23), conductor 2308, contact 2 of relay TOG2(24), the contact of relay LK1(24), to battery through the winding of relay FLG(24).

With the operation of relay FLG(24) a circuit is completed for operating the seize number group relays SNG1(25) and SNG2(25). Such circuit extends from ground, over the contact of relay FLG(24), conductor 2406, the contact of relay RNG(25), the contact of relay PUL(25), the contact of relay RCY2(25), contact 1 of relay CK0(25), the contact of relay MRL1(25), windings of relays SNG1(25) and SNG2(25), to battery through resistance J2(25).

Relay SNG1(25), upon operating, extends battery to a start conductor to a trunk number group connector, such as 114 of Fig. 1, for the purpose of interconnecting the marker with a trunk number group such as 115. Such circuit may be traced from battery, through resistance NGS(24), over the contact of relay SP(24), contact 1 of relay TLC1(24), the contact of relay TFK1(24), conductor 2407, contact 2 of relay SNG1(25), contact 1 of relay TR2(25), contact 1 of relay NGP(25), contact 2 of relay ECN(25), to the start conductor 2501 which extends over cables 2502 and 2503, to the connector 114 where it effects the interconnections of the marker and the trunk number group circuit 115. Relay UC(26) is operated in a circuit extending from ground, over contact 1 of relay SNG1(25), contact 2 of relay CK0(25), conductor 2504, to battery through the winding of relay UC(26). Relay UC(26) interconnects the units digit register relays U0, 1, 2, 4, 7(26) with the trunk number group 115 over cables 2605, 2606, 2607 and 2503 and over connector 114.

A hundreds block relay (not shown) is operated in the trunk number group 115 from one-out-of-ten conductors under control of the hundreds digit relays HN0, 1, 2, 4, 7(26). This circuit extends from battery, through resistance HBS(25), contact 1 of relay SNG2(25), contact 1 of relay SLCK1(25), conductor 2505, contact 4 of relay HN4(26), contact 4 of relay HN7(26), conductor 2608, through cables 2609, 2607 and 2503, connector 114 to the trunk number group 115 where it operates a hundreds block relay (not shown). The hundreds block relay (not shown), upon operating, returns ground, through connector 114, cables 2503 and 2502, over conductor 2506, to battery through the winding of the physical-theoretical number relay PTN(25), which thereupon operates. Relay PTN(25), upon operating, completes a circuit for operating a tens block relay (not shown) in the number group circuit 115 under the control of one-out-of-ten leads from the tens digit register relays T0, 1, 2, 4, 7(26). This circuit extends from battery, through resistance TBS(25), contact 2 of relay SNG2(25), winding of relay TBW(25), contact 2 of relay SLCK1(25), contact 1 of relay PN(25), contact 1 of relay TN(25), contact 2 of relay PTN(25), conductor 2507, contact 4 of relay T0(26), contact 1 of relay T1(26), conductor 2610, through cables 2611, 2606, 2607 and 2503, connector 114 to the trunk number group 115 where it operates a tens block relay (not shown) over a contact of the operated hundreds block relay (not shown). Similarly a units relay (not shown) in the number group 115 is operated in a circuit extending from battery, through resistance UBS(25), the contact of relay UT(25), conductor 2508, contact 4 of relay U4(26), contact 4 of relay U7(26), contact 4 of relay UC(26), conductor 2612, cables 2605, 2606, 2607 and 2503, connector 114 to the number group 115 where it operates a units relay (not shown).

In a manner similar to that described in the Busch and Adam-Avery disclosures for the number group translation information of directory numbers to equipment location information, the trunk number group 115 translates the trunk number 010 into the line-link frame number, the numbers of the vertical and horizontal groups on that frame, and the vertical file within that vertical group of the incoming trunk appearance on that line-link frame. This information is registered in the marker.

The marker, under control of the line-link frame location information pertaining to the appearance thereon of the incoming trunk, say appearance 111, attempts to select and seize over cable 118 and line-link connector 116 such appearance 111 in a manner similar to other marker seizures of line-link frames. If the marker cannot seize the pertinent frame or otherwise is unable to seize the appearance 111, it will recycle, thereby operating relay NGP(25), to energize, over its contact 2 this time, another start conductor 2509 to another number group circuit for translation of the second line-link appearance 112 of the incoming trunk. It will be assumed that the marker is successful in seizing the line-link frame terminating appearance 111. It will be noted that in Fig. 7, the incoming trunk tip and ring conductors are multipled through cables 701 and 702 to the line-link appearances 112 and 111. Sleeve leads 703 and 704 extend from the line-link appearances 112 and 111 through cables 701 and 702 to respective windings of relays TS2(7) and TS1(7) over the contact 2 of the other relay of the pair. When the marker selected appearance 111, ground on the line-link frame sleeve lead was extended through cable 702 to conductor 704, contact 2 of relay TS2(7) to battery through the winding of relay TS1(7).

When the marker has finished its functions with the incoming trunk circuit, number group 115 having been released in the meantime after registration in the marker of the trunk number translation, relay F(5) is released by removal of its operating battery. Relay F(5), in releasing, releases relay TF(7). Relay TF(7), upon releasing, provides a locking path for relay TS1(7) over contact 3 of relay TS1(7), conductor 711, contact 8 of relay LF(6), conductor 601, contact 3 of relay TF(7), conductor 705, to ground over contact 3 of relay IN(5). This same locking ground also extends over contact 2 of relay TS2(7) and over conductor 704 and cable 702 to the line-link appearance sleeve lead to hold the outgoing trunk circuit when the marker and sender release.

When the marker has finished its functions with the outgoing trunk circuit, relay F(4) is released by removal of its operating battery. Relay F(4), at its contact 2, removes ground from conductor 405, leading to the trunk-link frame over cables 201 and 108, to release the trunk-link relay (not shown) to close the tip, ring and sleeve conductors 211, 212 and 404 through to this outgoing trunk. Relay F(4), upon releasing, connects conductor 300 of Fig. 3 to the armature of relay P(4) in a circuit extending from the armature of relay P(4), contact 9 of relay D(4), contact 4 of relay F(4), conductor 401, contact 2 of relay SL1(2), conductor 207, contact 2 of relay OF(3), contact 4 of relay TT(3), to conductor 300 to the terminating office. Ground on the sleeve conductor 404 through the links from the incoming trunk holds relay TM(4) operated throughout the call.

*Outpulsing*

When the terminating office is ready to receive pulsing, ground on conductor 306 from that office is removed to thereby release relay E(3), which in turn releases relay EA(3). When relay EA(3) releases, the aforementioned condition of ground on the ring conductor 308 and battery on the tip conductor 307 to the sender 103 is changed to ground on the tip and battery on the ring. It will be recalled that prior to the release of relay EA(3), the tip conductor 307 was traced over contact 5 of relay EA(3) to battery through resistance C(3) and the ring conductor 308 was traced over contact 2 of relay EA(3), conductor 309, contact 8 of relay D(4), resistance H(4), contact 2 of jack A(4), upper winding of relay P(4), to ground over contact 4 of relay D(4). As will be obvious, upon the release of relay EA(3) above described, tip and ring conductors 307 and 308 to the sender 103 will reverse their conditions due to the contact arrangement of relay EA(3) such that the ring conductor 308 is connected to battery and the tip conductor 307 is connected to ground through the upper winding of relay P(4).

Whenever this tip-ring circuit is completed in sender 103 the upper winding of relay P(4) will be energized to overcome the middle bias winding of relay P(4) to thereby operate the armature to make contact with contact 1 of relay P(4), which is traced to battery over contact 3 of jack C(4) and through resistance lamp M(4). Since the armature of relay P(4) is connected to signaling conductor 300 to the terminating office as previously described, alternate operations and releases of relay P(4), in response to pulsing from sender 103, will transmit over conductor 300 a change from ground to battery to ground for each pulse of each of the seven called directory number digits. These digits will direct the terminating equipment at the terminating office to connect the outgoing trunk with the desired called subscriber in accordance, for example, with the incoming locally terminating call connection description in the Adam-Avery disclosure.

When the sender has finished with its outpulsing and is satisfied that the correct number of digits has been received at the terminating office, ground is removed from conductor 304 releasing relay D(4). Relay D(4), upon releasing, transfers, from its contact 9 to its contact 10, the aforementioned signaling conductor 300 over contact 4 of relay TM(4) to the armature of supervisory relay SV(4), thereby changing conductor 300 from the control of the pulsing relay P(4) to the control of the supervisory relay SV(4). The connection, at this juncture, is held by ground from contact 3 of relay IN(5) of the incoming trunk circuit, said ground extending to the sleeve conductor 404 of the outgoing trunk circuit, over conductor 705, conductor 704, contact 3 of relay TF(7), conductor 601, contact 8 of relay LF(6), conductor 703, contact 3 of relay TS1(7), contact 2 of relay TS2(7), sleeve conductor 704 of the line-link appearance 111 of the incoming trunk circuit, over the links of the cross bar switching machinery, to the sleeve conductor 404 of the trunk-link appearance of the outgoing trunk circuit.

*Supervisory relays*

The supervisory relay SV(4) of the outgoing trunk has ground on the left sides of its windings, ground on the right side of its upper winding, and the tip and ring conductors simplexed to the right side of the lower winding. The left sides of the windings of relay SV(4) may be traced through resistances M(4) and N(4), conductor 406, contact 7 of relay OF(3), conductor 310, contact 13 of relay D(4), conductor 407, to ground over contact 1 of relay E(3). The right side of the upper winding of relay SV(4) may be traced over conductor 408, to ground over contact 2 of relay MB(2). The right side of the lower winding of relay SV(4) may be traced through the right section of retard coil B(4), conductor 409 to the ring conductor 212 of the trunk link and through the left section of retard coil B(4), conductor 410 to the tip conductor 211 of the trunk link.

The tip, ring and sleeve conductors 211, 212 and 404 extend over the cross bar links to the tip, ring and sleeve conductors 706, 707 and 704 at the line-link appearance of the incoming trunk in Fig. 7. The tip and ring conductors 211 and 212 of the outgoing trunk circuit also extend over contacts 1 and 9 of relay CT(2), conductors 213 and 214, contacts 1 and 7 of relay TT(3), to tip and ring conductors 311 and 312 to the remote terminating office.

The supervisory relay SV(7) of the incoming trunk circuit has battery on the left sides of its windings, ground on the right side of its lower winding, and the tip and ring conductors of its line-link appearance simplexed to the right side of its upper winding. The left side of the windings of relay SV(7) may be traced to battery through resistances D(7) and E(7), conductor 708, contact 3 of relay E(5), to battery through resistance lamp A(5). The right side of the lower winding of relay SV(7) may be traced to ground over contact 5 of relay TS1(7) and contact 2 of relay TF(7). The right side of the upper winding of relay SV(7) may be traced over conductor 709, the left section of retard coil A(5), conductor 510, to the tip conductor 706 of the line-link appearance of the incoming trunk and over the right section of retard coil A(5), contact 12 of relay D(5), conductor 511, to the ring conductor 707 of the line-link appearance.

The tip and ring conductors 706 and 707, of the line-link appearance of the incoming trunk circuit, extend over conductors 510 and 511, conductors 513 and 514, contacts 1 and 6 of relay LT(5). The tip and ring conductors 517 and 512 from the originating office extend over contacts 1 and 6 of relay LT(5), conductors 513 and 514, conductors 510 and 511, tip and ring conductors 706 and 707 of the line-link appearance of the incoming trunk, over the links, tip and ring conductors 211 and 212 of the trunk-link appearance of the outgoing trunk, contacts 1 and 9 of relay CT(2), conductors 213 and 214, contacts 1 and 7 of relay TT(3), to tip and ring conductors 311 and 312 to the terminating office.

Relay SV(7) of the incoming trunk circuit is unaffected by operations and releases of relay E(5) of the incoming trunk circuit. Relay SV(7) is operated or released by battery or ground respectively transmitted over the tip and ring conductors from the outgoing trunk circuit, which battery or ground condition is determined respectively by the operation or release of relay E(3) of the outgoing trunk circuit through the lower winding of relay SV(4) of the outgoing trunk. Relay E(3) is released by lack of ground on conductor 306 from the terminating office, an "on hook" condition, or is operated by ground on conductor 306 from the terminating office, an "off hook" or answer condition.

Relay SV(4) of the outgoing trunk circuit is unaffected by operations and releases of relay E(3) of the outgoing trunk circuit. Relay SV(4) is operated or released by battery or ground respectively transmitted over the tip and ring conductors from the incoming trunk circuit, which battery or ground condition is determined respectively by the operation or release of relay E(5) of the incoming trunk circuit through the lower winding of relay SV(7) of the incoming trunk. Relay E(5) is released by lack of ground on conductor 509 from the originating office, an "on hook" condition, or is operated by ground on conductor 509 from the originating office, an "off hook" or calling condition.

*Answer by called subscriber*

When the called subscriber answers, ground is returned from the terminating office over conductor 306 to operate relay E(3), in turn operating relay EA(3) which performs no useful function at this time. The operation of relay E(3) removes ground from the windings of relay SV(4) and substitutes therefor battery through resistance lamp E(3) over contact 2 of relay E(3). This battery signal is extended through the lower winding of relay SV(4), in parallel over the tip and ring conductors of the trunk link and the line link and through the upper winding of relay SV(7) of the incoming trunk circuit, and over the tip and ring conductors to the terminating office. Battery to the winding of relay SV(7) operates relay SV(7). Relay SV(7), operated, transmits battery to the originating office over conductor 502 as an indication that the call has been answered. Since relay E(5) of the incoming trunk is operated, it transmits battery through the upper winding of relay SV(7), over the line and trunk links to the lower winding of relay SV(4) to operate relay SV(4). Relay SV(4), operated, applies battery to the signaling conductor 309 to the terminating office, from battery, through resistance lamp M(4), contact 2 of relay SV(4), contact 4 of relay TM(4), contact 10 of relay D(4), contact 4 of relay F(4), conductor 401, contact 2 of relay SL1(2), conductor 207, contact 2 of relay OF(3), contact 4 of relay TT(3), to conductor 300, as previously traced.

The conversion may be maintained under the supervision of relays SV(7) and SV(4) of the incoming and outgoing trunk circuits, the marker, incoming register, sender and associated connector circuits having released as described in the Busch and Adams-Avery disclosures, leaving the trunk circuits in control of the connection.

*Called end disconnects first*

When the called end disconnects, ground is removed from conductor 306 to release relay E(3) of the outgoing trunk circuit. Relay E(3), upon releasing, changes battery to ground through the lower winding of relay SV(4) and over the tip and ring conductors of the trunk and line links to release relay SV(7) of the incoming trunk. Relay SV(7), upon releasing changes battery to ground on the signaling conductor 502 to the originating office as a disconnect signal.

In response to the disconnect signal, the originating office disconnects, thereby removing ground from conductor 509 to release relay E(5) of the incoming trunk. Relay E(5), upon releasing, changes battery to ground through the upper winding of relay SV(7), over the tip and ring conductors of the line and trunk links, to the lower winding of relay SV(4) of the outgoing trunk, thereby releasing relay SV(4). Relay SV(4), upon releasing, changes battery to ground over conductor 300 to the terminating office as a disconnect signal. The release of relay E(5) of the incoming trunk releases relay IN(5), which in turn releases the rest of the trunk to an idle condition. Upon the release of relay IN(5), ground is removed from the sleeve conductor 704 of the line-link appearance of the incoming trunk and this releases relay TM(4) of the outgoing trunk circuit. Relay TM(4), upon releasing, removes, at its contact 8, an obvious shunt of resistance R(4) across condenser B(4). Condenser B(4) begins to acquire a charge from positive battery 411 through resistance V(4), condenser B(4), resistance R(4), contact 3 of relay G(4), winding of relay G(4), to battery over contacts 2 and 3 of relay BS(4). When condenser B(4) has acquired sufficient charge, tube V(4) will fire to operate relay G(4) in series therewith in an obvious circuit. Relay G(4) locks over its contact 4 and at its contact 1 opens the locking circuit for relay MB(2) which releases. The operation of relay G(4), shunts condenser B(4) in an obvious circuit over contact 2 of relay G(4). Relay MB(2), upon releasing, releases relay BS(4), which in turn releases relay G(4). Relay MB(2), in the meantime, has provided an additional shunt across condenser B(4) in the circuit from the right side of condenser B(4), resistance R(4), conductors 412 and 413, contact 9 of relay MB(2), conductor 215, to the left side of condenser B(4).

*Calling end disconnects first*

It will be appreciated, without necessitating detailed discussion in view of the preceding disconnect condition, that if the calling or originating end disconnects first, relay E(5) of the incoming trunk will release to return the incoming trunk to normal and to release the relay SV(4) of the outgoing trunk. The release of relay SV(4) returns a ground signal to the terminating office as a disconnect signal which, when effected, releases relay E(3) of the outgoing trunk. Furthermore, the release of the incoming trunk removes ground from the sleeve conductors 704 and 404 of the line and trunk links to initiate to completion the release of the outgoing trunk, as above described.

*Locally terminating call connection*

If the incoming call were for a local subscriber, say subscriber 117, the office code digits would be different say 241 instead of 243. In this case a circuit would be completed for operating a relay indicative of the local class of the office code, say the local physical "A" relay LPA(23) in the marker. The circuit would extend from ground, over contact 3 of relay CKG1(23), conductor 2304, contact 1 of relay CC0(22), contact 4 of relay CC1(22), conductor 2216, to battery through the winding of relay LPA(23). It will be appreciated that the "C" digit register relays CC0(22) and CC1(22) would have been operated to register the "C" digit 1 in this case. Relay LPA(23) completes a circuit for operating the terminating class relays TER1(23), TER2(23) and TER3(23) from ground in the originating register marker connector 100, over cables 102 and 2200, conductor 2217, contact 4 of relay TAN(23), the contact of relay LPA(23), to battery through the windings of the relays TER1(23), TER2(23) and TER3(23). The operation of these class relays directs the marker to handle the connection as one to terminate locally as described in the Adam Avery disclosure, above referred to.

In such a case the marker will necessarily be required to interconnect the trunk-link appearance of the incoming trunk with the line-link appearance of the subscriber's line 117. The marker will operate the negative or upper half of relay F(5) of the incoming trunk circuit in this instance. Relay F(5) will thereby operate only its contacts 1 and 2 (as distinguished from operating only its contacts 3 and 4 as under the previous description). Relay LF(6) is operated from ground, over contact 1 of relay F(5), conductor 508, to battery through the winding of relay LF(6). Relay LF(6) operates relay LT(5) from ground, over contact 5 of relay LF(6), conductor 603, to battery through the winding of relay LT(5). Relay LT(5) switches the incoming tip and ring conductors 517 and 512 from the previously described paths traced to the line-link appearance of the incoming trunk to other paths to the trunk-link appearance of such trunk, namely over contacts 2 and 5 of relay LT(5), through repeat coil A(5), conductors 515 and 516, 710, contacts 3 and 8 of relay RC(6), conductors 600 and 602, cable 110 to the trunk-link frame. The marker then handles the call on the same basis as described in the Adam-Avery disclosure including functions of the incoming register link, incoming register and the functions of the supervisory relay CS(5) in place of the relay SV(7), used for supervision on the above-described tandem connection, as well as operations associated with the ringing selective switch of Fig. 6.

*Toll connections*

The incoming register and marker are equipped to handle a call on a toll basis in a manner similar to that above described for a tandem call. For an incoming seven-digit call on a toll basis the "TOL" relays in the incoming register and marker will be operated as an indication of the class of the call. Otherwise the circuit operations are similar to those above described when the "TAN" relays were operated. Furthermore on toll calls, the register and marker are equipped to handle directing codes prefixing the seven-digit directory number or the eight-digit party line directory number.

While a particular circuit arrangement has been described herein, by way of an example of the utility of the present invention, the scope of such invention is not to be considered as being limited to such embodiment. Variations of the circuits, order of operation of parts thereof, and details of operation thereof, etc. are possible within the scope of the present invention. The appended claims alone describe the scope of the invention.

What is claimed is:

1. In a telephone system, first switches, second switches, links arranged to interconnect said first switches and said second switches, circuits of one class appearing in said second switches, circuits of another class appearing in said first switches, incoming circuits, at least one of said incoming circuits appearing in at least one of said first switches and in at least one of said second switches, control circuits, means under the control of said control circuits and including first switches and links and second switches to set up an interconnection between said one incoming circuit and a circuit of either class, and means included in said first mentioned means under the control of said control circuits to operate the first or the second switch in which said one incoming circuit appears in accordance with the desired termination of said interconnection.

2. In a telephone system, first switches, second switches, links arranged to interconnect said first switches and said second switches, circuits of one class appearing in said second switches, circuits of another class appearing in said first switches, incoming circuits, at least one of said incoming circuits appearing in at least one of said first switches and in at least one of said second switches, control circuits, means under the control of said control circuits and including first switches and links and second switches to set up an interconnection between said one incoming circuit and a circuit of either class, means to inform said control circuits of the desired class of termination of said interconnection, and means included in said first mentioned means under the control of said control circuits to operate the first or the second switch in which said one incoming circuit appears in accordance with the desired class of termination of said interconnection.

3. In a telephone system, first switches, second switches, links arranged to interconnect said first switches and said second switches, circuits of one class appearing in said second switches, circuits of another class appearing in said first switches, incoming circuits, at least one of said incoming circuits appearing in at least one of said first switches and in at least one of said second switches, control circuits, means under the control of said control circuits and including first switches and links and second switches to set up an interconnection between said one incoming circuit and a circuit of either class, means under the control of said one incoming circuit to inform said control circuits of the class of termination of said interconnection desired by said one incoming circuit, and means included in said first mentioned means under the control of said control circuits in response to said class of termination information to operate selectively the first or the second switch in which said one incoming circuit appears in accordance with the class of termination information.

4. In a telephone system, first switches, second switches, links arranged to interconnect said first switches and said second switches, circuits of one class appearing in said second switches, circuits of another class appearing in said first switches, incoming circuits arranged to handle various classes of calls, at least one of said incoming circuits appearing in at least one said first switches and in at least one said second switches, a first of said classes of calls requiring an interconnection between said one incoming circuit and a circuit of said other class, a second of said classes of calls requiring an interconnection between said one incoming circuit and a circuit of said one class, control circuits, means under the control of said one incoming circuit to inform said control circuits of the associated class of call, and means under the control of said control circuits in response to said class of call information to operate selectively the first switch or the second switch in which said one incoming circuit appears in accordance with the class of call associated with said one incoming trunk.

5. In a telephone system, first switches, second switches, links arranged to interconnect said first switches and said second switches, circuits of one class appearing in said second switches, circuits of another class appearing in said first switches, incoming circuits arranged to handle various classes of calls, at least one of said incoming circuits appearing in at least one of said first switches and in at least one of said second switches, a first of said classes of calls requiring an interconnection between said one incoming circuit and a circuit of said other class, a second of said classes of calls requiring an interconnection between said one incoming circuit and a circuit of said one class, control circuits, means under the control of said one incoming circuit to inform said control circuits of the associated class of call, means under the control of said control circuits in response to said first class of call information to operate the second switch in which said one incoming circuit appears, and means under the control of said control circuits in response to the second class of call information to operate the first switch in which said one incoming circuit appears.

6. In a telephone system, line switches, trunk switches, links arranged to interconnect said line switches and said trunk switches, outgoing trunks appearing in said trunk switches, subscribers' lines appearing in said line switches, incoming trunks, at least one of said incoming trunks appearing in at least one of said line switches and in at least one of said trunk switches, control circuits, means under the control of said control circuits and including line switches and links and trunk switches to set up an interconnection between said one incoming trunk and a subscriber's line or between said one incoming trunk and an outgoing trunk, and means included in said first mentioned means under the control of said control circuits to operate the line switch or the trunk switch in which said one incoming trunk appears in accordance with the desired termination of said interconnection.

7. In a telephone system, line switches, trunk switches, links arranged to interconnect said line switches and said trunk switches, outgoing trunks appearing in said trunk switches, subscribers' lines appearing in said line switches, incoming trunks, at least one of said incoming trunks appearing in at least one of said line switches and in at least one of said trunk switches, control circuits, means under the control of said control circuits and including line switches and links and trunk switches to set up an interconnection between said one incoming trunk and a subscriber's line or between said one incoming trunk and an outgoing trunk, means to inform said control circuits of the desired termination of said interconnection, and means included in said first mentioned means under the control of said control circuits to operate the line switch or the trunk switch in which said one incoming trunk appears in accordance with the desired termination of said interconnection.

8. In a telephone system, line switches, trunk switches, links arranged to interconnect said line switches and said trunk switches, outgoing trunks appearing in said trunk switches, subscribers' lines appearing in said line switches, incoming trunks, at least one of said incoming trunks appearing in at least one of said line switches and in at least one of said trunk switches, control circuits, means under the control of said control circuits and including line switches and links and trunk switches to set up an interconnection between said one incoming trunk and a subscriber's line or between said one incoming trunk and an outgoing trunk, means under the control of said one incoming trunk to inform said control circuits of the termination of said interconnection desired by said one incoming trunk, and means included in said first mentioned means under the control of said control circuits in response to said termination information to operate selectively the line switch or the trunk switch in which said one incoming trunk appears in accordance with the termination information.

9. In a telephone system, line switches, trunk switches, links arranged to interconnect said line switches and said trunk switches, outgoing trunks appearing in said trunk switches, subscribers' lines appearing in said line switches, incoming trunks arranged to handle various classes of calls, at least one of said incoming trunks appearing in at least one of said line switches and in at least one of said trunk switches, a first of said classes of calls requiring an interconnection between said one incoming trunk and a subscriber's line, a second of said classes of calls requiring an interconnection between said one incoming trunk and an outgoing trunk, control circuits, means under the control of said one incoming trunk to inform said control circuits of the associated class of call, and means under the control of said control circuits in response to said class of call information to operate selectively the line switch or the trunk switch in which said one incoming trunk appears in accordance with the class of call associated with said one incoming trunk.

10. In a telephone system, line switches, trunk switches, links arranged to interconnect said line switches and said trunk switches, outgoing trunks appearing in said trunk switches, subscribers' lines appearing in said line switches, incoming trunks arranged to handle various classes of calls, at least one of said incoming trunks appearing in at least one of said line switches and in at least one of said trunk switches, a first of said classes of calls requiring an interconnection between said one incoming trunk and a subscriber's line, a second of said classes of calls requiring an interconnection between said one incoming trunk and an outgoing trunk, control circuits, means under the control of said one incoming trunk to inform said control circuits of the associated class of call, means under the control of said control circuits in response to said first class of call information to operate the trunk switch in which said one incoming trunk appears, and means under the control of said control circuit in response to said second class of call information to operate the line switch in which said one incoming trunk appears.

11. In a telephone system, line switches, trunk switches, links arranged to interconnect said line switches and said trunk switches, outgoing trunks appearing in said trunk switches, subscribers' lines appearing in said line switches, incoming trunks arranged to handle various classes of calls and provided with trunk numbers, at least one of said incoming trunks appearing in at least one of said line switches and in at least one of said trunk switches, a first of said classes of calls requiring an interconnection between said one incoming trunk and a subscriber's line, a second of said classes of calls requiring an interconnection between said one incoming trunk and an outgoing trunk, control circuits, means under control of said one incoming trunk to inform said control circuits of the associated class of call and of the particular trunk number, means under the control of said control circuits in response to said first class of call information to operate the trunk switch in which said one incoming trunk appears, means under the control of said control circuits in response to said second class of call information to translate the trunk number into equipment location information of the line switch appearance of said incoming trunk and to operate said located line switch.

12. In a telephone system, line switches, trunk switches, links arranged to interconnect said line switches and said trunk switches, outgoing trunks appearing in said trunk switches, subscribers' lines appearing in said line switches, incoming trunks arranged to handle various classes of calls and provided with trunk numbers, at least one of said incoming trunks appearing in at least one of said line switches and in at least one of said trunk switches, a first of said classes of calls requiring an interconnection between said one incoming trunk and a subscriber's line, a second of said classes of calls requiring an interconnection between said one incoming trunk and an outgoing trunk, control circuits, means under the control of said one incoming trunk to inform said control circuits of the associated class of call and of the particular trunk member, means under the control of said control circuits in response to said first class of call information to operate the trunk switch in which said one incoming trunk appears, a translator, means under the control of said control circuits in response to said second class of call information to transmit said trunk number to said translator and to receive from said translator the line switch appearance location information for the said one incoming trunk, and means under control of said control circuits in response to said line switch appearance location information to operate the line switch in which said one incoming trunk appears.

ALOYSIUS J. BUSCH.
HENRY J. MICHAEL.

REFERENCES CITED

The following references are of record in the file of this patent:

UNITED STATES PATENTS

| Number | Name | Date |
|---|---|---|
| 1,531,218 | Powell | Mar. 24, 1925 |
| 1,688,162 | Stehlik | Oct. 16, 1928 |
| 2,235,890 | King | Mar. 25, 1941 |
| 2,267,897 | Mahoney | Dec. 30, 1941 |